United States Patent [19]
Box et al.
[11] Patent Number: 4,908,784
[45] Date of Patent: Mar. 13, 1990

[54] METHOD AND APPARATUS FOR ASYNCHRONOUS TIME MEASUREMENT

[75] Inventors: Gary W. Box, Golden Valley; Thomas S. Foote-Lennox, Bloomington; Rodney G. Herreid, St. Louis Park; James F. Hoff, Shoreview; Dennis J. Leisz, Minnetonka; John A. Perlick, Brooklyn Park; Terry T. Steeden, Richfield; John J. Turner, New Brighton; Curtis R. Alexander, Forest Lake, all of Minn.

[73] Assignee: Wave Technologies, Inc., Plymouth, Minn.

[21] Appl. No.: 81,368

[22] Filed: Aug. 4, 1987

[51] Int. Cl.[4] .......................... G04F 8/00; G06F 15/20

[52] U.S. Cl. .................................. 364/569; 364/556; 368/119; 368/120; 377/20

[58] Field of Search ................................ 368/118–121; 364/565, 569, 556; 377/20, 25, 29, 39, 44; 307/602; 328/126

[56] References Cited

U.S. PATENT DOCUMENTS

| | | | |
|---|---|---|---|
| 3,133,189 | 5/1964 | Bagley et al. . | |
| 4,164,648 | 8/1979 | Chu | 368/119 |
| 4,165,459 | 8/1979 | Curtice | 368/119 |
| 4,303,983 | 12/1981 | Chaborski | 377/20 |
| 4,392,749 | 7/1983 | Clemmons, Jr. | 368/119 |
| 4,516,861 | 5/1985 | Frew et al. | 368/120 |
| 4,523,288 | 6/1985 | Hayashi . | |
| 4,613,950 | 9/1986 | Knierim et al. | 377/20 |
| 4,637,733 | 1/1987 | Charles et al. | 368/120 |
| 4,678,345 | 7/1987 | Agoston | 368/120 |
| 4,764,694 | 8/1988 | Winroth | 377/20 |

OTHER PUBLICATIONS

Review of Scientific Instruments, Sep. 1968, "Digital Time Intervalometer", R. Nutt, pp. 1342–1345.

*Primary Examiner*—Parshotam S. Lall
*Assistant Examiner*—Kevin J. Teska
*Attorney, Agent, or Firm*—Vidas & Arrett

[57] ABSTRACT

The present invention relates to time measurement apparatus and method for measuring, with picosecond precision, intervals between single edged events, where each measured interval comprises the summation of a rough clock count and fine or calibrated vernier counts of measured fractional clock periods before and after each START and STOP event selected from a calibrated vernier memory. The calibrated vernier memory takes the form of a table of linear voltage versus time developed using pseudo-random generated measurement events of random duration and random separation.

25 Claims, 27 Drawing Sheets

BULKHEAD
LCD DISPLAY
SWITCH/INDICATORS
CONNECTORS
FRONT PANEL
FIBER OPTIC LINK
OVEN SW
22
XTAL
MULTIBUS
12
FILTERS
8
±15
10
+24
POWER SUPPLIES
6
+5.0
-4.6
-2.0

TO FIG. 12

METHOD AND APPARATUS FOR ASYNCHRONOUS TIME MEASUREMENT

BACKGROUND OF THE INVENTION

The present invention relates to time measurement apparatus and, in particular, to a system and method for measuring, with picosecond precision, intervals between single edged events, wherein each measured interval comprises the summation of a rough clock count and fine or calibrated vernier counts of measured fractional clock periods before and after each START and STOP event selected from a calibrated vernier memory.

Basic to the understanding of almost any physical event is a requirement of obtaining accurate timing information relative to the occurrence of the event. For a variety of developing technologies, it is critical to obtain measurements in the picosecond range (i.e. $1.0\times10^{-12}$ seconds) with a related accuracy. Examples of such technologies are found in a host of research, testing and development applications from nuclear and materials research to semiconductor and device testing to radar, computer and communications systems developments.

Heretofore and although a variety of time measurement devices and methodologies have been used, measurement accuracy for non-repetitive events has been limited by the accuracy of the equipment's master clock. To date, the most accurate systems have been constructed around very precise crystal clocks operating at relatively high frequencies (e.g. 100 MHz) with nanosecond clock signal periods. Comparison of a measured event to such a clock provides a correspondingly accurate measurement of the sampled event, except for test fixture error and fractional clock periods lost when the beginning and ending of the event are not synchronous with the measurement clock. Where measured events are repetitive in nature, however, additional accuracy may be achieved over repetitive samplings by fitting the measured data via a variety of averaging or statistical smoothing or interpolation algorithms to obtain relatively precise measurements with minimal error.

For non-repetitive, single occurrence or asynchronous events, however, and especially events of subnanosecond duration, accuracy is critical since the uncorrected measurement errors may exceed or approach in magnitude the event being measured. That is, for most such systems, accuracy is obtainable only relative to complete clock cycles which are counted as the event is occurring and from which a time value is extracted. Where, however, the event begins or ends midcycle, the corresponding partial cycle intervals are lost and appear as error, over and above any inherent error in the system itself. This error may not be averaged.

Some systems of which Applicant is aware of which measure time relative to the counting of clock cycles from one or more oscillators may be found upon directing attention to U.S. Pat. Nos. 4,164,648; 4,186,298; 4,350,953; 4,397,031; and 4,598,375.

Applicant is also aware of a variety of attempts to expand the measurement scale or resolve or interpolate error occurring during measurement, which may be found upon directing attention to U.S. Pat. Nos. 2,896,160; 3,133,189; 3,218,553; 3,505,594; 3,753,111; 3,970,828; 4,165,459; 4,301,360; 4,504,155; and 4,613,950. These latter systems generally employ techniques for performing multiple levels of time measurement (e.g. a coarse count and a fine or vernier count representative of a fractional portion of a clock cycle). Simultaneous operation of the two counters or measurement device, depending upon the methodology employed, enables the measurement of the fractional cycle error.

Although the present invention uses a coarse clock counter to measure the full cycle portion of any event, it additionally uses a separate ramped vernier measurement means and a self or operator enabled, calibrated table look-up memory for independently measuring each fractional beginning and ending time interval relative to the base clock signals. Of fractional measurement apparatus of this type, Applicant is also aware of an article by R. Nutt, Digital Time Intervalometer, 39 Review of Scientific Instruments 1342 (September, 1968) and U.S. Pat. Nos. 4,303,983 and 4,637,733. Of these, U.S. Pat. No. 4,303,983 discloses a system operating to produce a coarse time determined from a number of base clock cycles counted during a synchronous interval portion and to which are added and subtracted fractional cycle times. The fractional times are determined from separate time amplitude conversion circuitry which is separately calibrated after each measurement via internally generated start/stop signals to produce conversion factors by which measured analog amplitudes are adjusted prior to being coupled to associated display apparatus. U.S. Pat. No. 4,637,733, in turn, discloses apparatus wherein a ramped linear voltage is used to determine the fractional beginning and end times of an asynchronous event. It particularly discloses a means for developing an error table for compensating for ramp non-linearity. The calibration table is determined through numerous samples of constant pulse duration, although of differing time separation. The error samples are averaged, with the average error values being stored for access during processing of measured events.

SUMMARY OF THE INVENTION

In contrast to the foregoing patents, the present invention, pursuant to a pseudorandom, Monte Carlo scheme, operates at initialization or at operator request to calibrate itself via the development of a table of linear voltage versus time values. The table is developed for a single clock cycle for each of the beginning and ending periods from a plurality of samples of random width and random separation which are coupled to the event measurement circuitry. Measurement of the fractional beginning and end times of any event is thus effectuated with a voltage address developed by associated start and stop capacitive circuitry which is used to access the stored corresponding time value from a fine count memory.

It is accordingly a primary object of the present invention to measure repetitive or non-repetitive, edge-triggered events and provide a timer accurate to less than 100 picoseconds and a resolution of 1 picosecond.

It is a further object of the invention to measure monitored events relative to a coarse count obtained from a precise 100 MHz crystal oscillator.

It is a further object of the invention to measure fractional clock cycle intervals via capacitively generated ramp voltages which address a calibrated fine count memory.

It is a still further object of the invention to calibrate the fine count memory with a plurality of pseudo-random measured voltages from sample events of random duration and random separation.

It is a yet further object of the invention to construct the apparatus around a noise free bus architecture including an industry standard interface whereby the apparatus may be remotely operated as part of a larger test system.

The foregoing objects, among others, are particularly achieved in the presently preferred embodiment which is comprised of a rack-mounted assembly including a plurality of isolated, separately filtered power supplies; a micro-computer processor including an industry standard IEEE-488 interface; and an internal bus-configured interface for communicating between the processor and the measurement and calibration circuitry.

The measurement circuitry comprises ECL analog measurement and TTL logic circuitry for obtaining a coarse interval count, generating and controlling the START and STOP ramps and converting the measured voltages used to determine the fractional beginning and ending intervals of any measured interval. The coarse interval count is obtained relative to a stable, precision 100 MHz crystal oscillator. Separate calibration circuitry operates at system initialization or upon selective operator intervention thereafter, to pseudo-randomly produce random width, randomly spaced sample START, STOP signals from which a related fine count table is developed for use in subsequent fine count measurements. The associated interface circuitry level converts the various signals and couples the calibration and measurement circuitry to one another and the central processor.

The foregoing objects, advantages and distinctions of the invention, among others, as well as the detailed construction of the invention, will however become more apparent upon reference to the following description thereof with respect to the appended drawings. Before referring thereto, it is to be appreciated the following description is made by way of the presently preferred embodiment only and is not intended to be all-encompassing in its scope of explanation. It accordingly should not in any way be interpreted in limitation of the spirit and scope of the invention. To the extent modifications and/or improvements have been considered, they are described as appropriate.

DESCRIPTION OF THE PREFERRED EMBODIMENT

Figure 1:
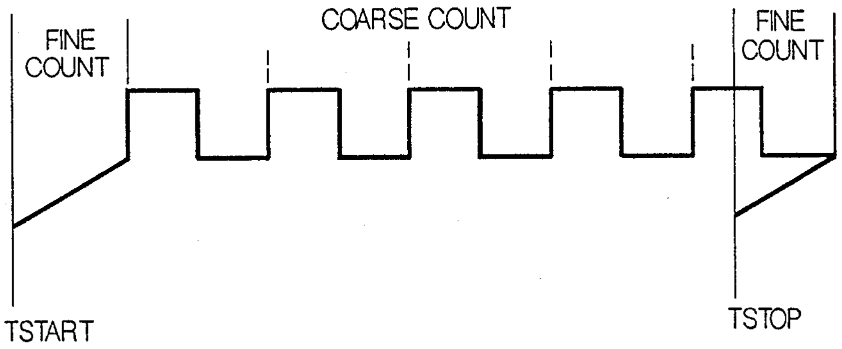
FIG. 1 shows a conceptual line diagram of the operation of the present measurement apparatus.

Referring to FIG. 1, a conceptual line diagram is shown of the methodology employed by the present invention to measure with picosecond precision either repetitive or non-repetitive events so long as the event exhibits a detectable edge condition. Specifically, the invention divides the interval to be measured into three periods. These are a coarse count period and START and STOP fine count periods. The coarse count period is comprised of a whole integrated number of clock cycles produced by a precisely calibrated, synchronous, 100 MHz master clock signal. The fine count periods are fractional measures of one master clock cycle and are determined relative to time values stored within a calibrated fine count memory (FCM). That is, separate randomly derived START and STOP interval values are stored which are fitted to and exemplary of the ramped, straight line, time vs. charge characteristic exhibited by the START and STOP measurement circuitry of the invention.

In particular, measurement of the fine count periods is achieved by charging individual capacitors in the START/STOP measurement circuitry from a regulated current source from the beginning of the separately detected asynchronous START/STOP events until the next leading edges of the cyclical master clock signal. With the occurrence of the clock signal, the attained analog capacitor voltage is converted to a digital form and used to compute the address for the corresponding time interval contained within the fine count memory. The $T_{START}$ and $T_{STOP}$ times are next added and subtracted from the course count which is obtained in conventional fashion by counting each complete clock cycle for the intervening period.

The measurement of the foregoing fine and coarse count periods are achieved from measured analog event values which are converted to digital form and processed via a microprocessor having access to the FCM. Very precise measurements are assured through the calibration of the FCM relative to the same internal circuitry used to measure the measured events which are separately corrected for potential delays induced by the test fixture, including its coupling leads. The details of such calibrations, correction and measurement processes and apparatus will be described hereinafter.

Figure 2:
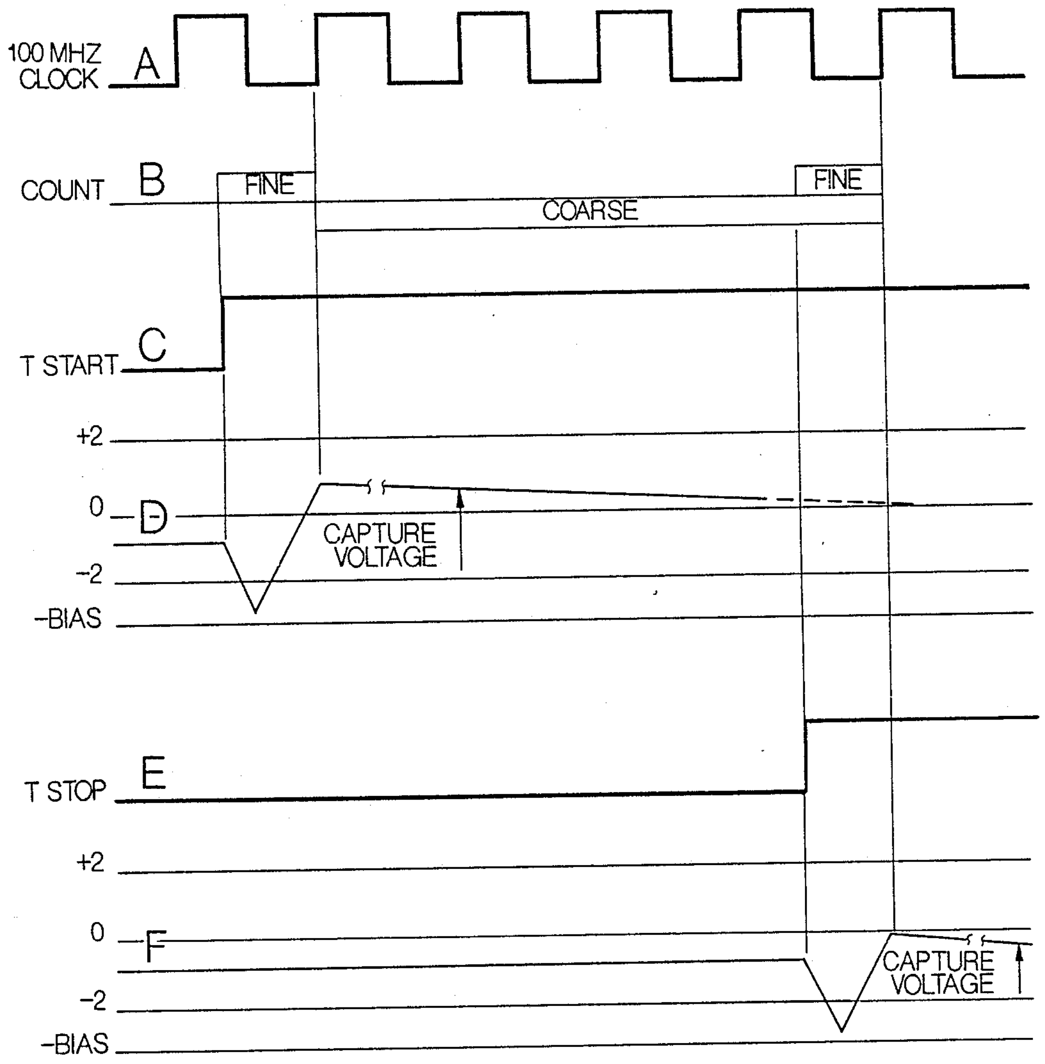
FIG. 2, comprised of waveforms A through F, shows a conceptual timing diagram of the development of the ramped START/STOP voltages from which the fine count intervals are determined.

In that regard and referring to FIG. 2, a number of waveforms A through F are shown which depict in greater detail the operation of the circuitry relative to the foregoing conceptual operation. Specifically, the fine count and coarse count periods are shown relative to a typical asynchronous event demonstrated by the detected START and STOP edge events shown in waveforms C and E relative to the master clock and the determined fine and coarse count periods of waveforms A and B. Waveforms D and F, in turn, shows the operation of the invention during the fine count periods, which is the same for either the START or STOP periods.

That is, upon the occurrence of an event, whether a START or STOP, a regulated current supplied to a capacitor in associated START/STOP track and hold circuitry is interrupted, causing the capacitor to discharge from a clamped voltage near ground level to a voltage $V_{bias}$ and from which the capacitor is recharged until the occurrence of the next rising edge of the master clock. In that regard it is to be noted a rising or falling clock edge can be defined by the operator as the trigger for terminating the charge time.

Due to attendant timing delays in the digital circuitry, an additional clock period is also provided before the capacitor is actually clamped, although all of which delays are accounted for by the CPU 2 and processing circuitry. The physical reading of the voltage then occurs approximately 3 clock cycles later, after which the measured analog voltage is converted to a digital form and used to address the FCM. By not measuring the clamped voltage until sometime after the defined clock edge, a slight discharge occurs in the clamp circuitry, although which is constant for all samples and measurements. This double ramp measurement produces a cleaner definition of the clamped voltage and thereby provides improved measurement accuracy.

Through the use of precision capacitors, a straight line charging characteristic is achieved which over the range of a −2 volts to a +2 volts is defined to coincide with one master clock cycle or a period of 10 nanoseconds (NSEC). During calibration and through the use of 14 bit analog to digital converters each potential 10 NSEC clock cycle is subdivided into approximately 16,000 discrete intervals corresponding to measured voltages derived from some 200,000 samplings exhibited at the START/STOP ramp circuitry. Although larger samplings could be used, experience has shown the foregoing sample size to produce sufficient accuracy and redundancy in plotting the linear points to assure picosecond accuracy.

Discounting for error margins at the upper and lower ramp ends, the circuitry uses approximately 12,000 of these sample points to provide a resolution of approximately 0.825 picoseconds per sub-division and relative to which the measured event may be compared to determine its START/STOP times. That is, upon converting the measured analog voltage to a 14 bit digital value, that value is used to address the FCM whereat the corresponding, precalibrated time value is stored. In a similar fashion, ±START and ±STOP fine counts are determined for each measured event and respectively added and subtracted from the coarse count which is obtained in conventional fashion by maintaining a count of the intervening clock cycles.

Figure 3:
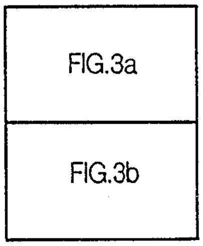
FIG. 3 shows an overall system block diagram.

Turning attention next to FIG. 3, a generalized block diagram is shown of the circuitry used by the present invention to achieve the foregoing results which is configured in a bench top/rack mountable chassis for use by itself or as part of a test system, where it may be operated under computer control. With that in mind, the CPU circuitry 2 includes an IEEE 488 interface through which a remote control connection can be made and used to configure and operate the circuitry during task operations.

As presently configured, the CPU 2 comprises an Intel single card computer, model ISBC 286/10A. Associated materials describing the operation thereof may be obtained from the manufacturer. In addition to the IEEE-488 interface, it includes an 80286 processor, an 80287 coprocessor, a 9600 baud RS422 serial port and a multibus interface. Otherwise, the CPU board 2 also contains the fine count memory 4 which comprises four 32K RAM chips, two of which store START ramp data and the other two of which store STOP ramp data. The other available memory contains the microinstructions used to operate the CPU and associated circuitry in the fashion described herein and the operator programmed or remotely programmed operating parameters.

In the latter regard, the front panel permits the operator to select a number of operating conditions which are indicated by associated pilot lights on the panel. These are whether the circuitry is to be controlled remotely, in which event all other pilots are turned off; whether the master clock is powered; and one of four operating modes wherein the circuitry may be internally and externally calibrated, operated in a burst mode, pursuant to a separately entered sample size, or in a continuous mode. Associated manual, automatic and external trigger functions are also provided along with an ability to externally define START/STOP gate signals and relative to which measurements are taken. Additionally, the operator is able to establish a variety of computed values which may be displayed on a provided forty character LCD display. These are AVERAGE — the average pulse width, STANDARD — the sample standard deviation, MINIMUM — the minimum sample pulse width, MAXIMUM — the maximum sample pulse width, RANGE — the difference between the MINIMUM and MAXIMUM, and SAMPLE SIZE — the number of samples to be taken.

Power is supplied to the various circuitry by five isolated power supplies 6, 8 and 10 which supply the voltages shown by way of appropriate filter circuitry 12. In that regard, it is to be noted two power switches are provided, one on the front of the operator panel and one on the rear. The rear panel switch serves as a manual bypass switch to assure the master clock is always on to avoid unnecessary warm up delays, even though the front panel power switch may be off. Upon shutting the rear panel switch off, power control may be delegated to the front panel switch.

Also provided are a number of coaxial connectors whereat the measured START/STOP events, external calibration signals and fiberoptic communication signals are coupled to and from the CPU 2.

Otherwise, the circuitry is constructed around a bus architecture to enable the CPU 2 to interact with the measurement circuitry 14 and calibration circuitry 16 by way of the interface circuitry 18 and 20. The internal interface circuitry 20 operates to convert and properly couple ECL/TTL signals between the various circuitry. The external interface circuitry 18 couples the fiberoptic input event signals and external inputs between the front panel, CPU and measurement circuitry.

Before describing the specific operation of the circuitry, it is also to be noted the 100 MHz crystal oscillator 22 is precisely calibrated by the National Bureau of Standards to an accuracy of $1.0\times 10^{-8}$ seconds.

Figure 5:
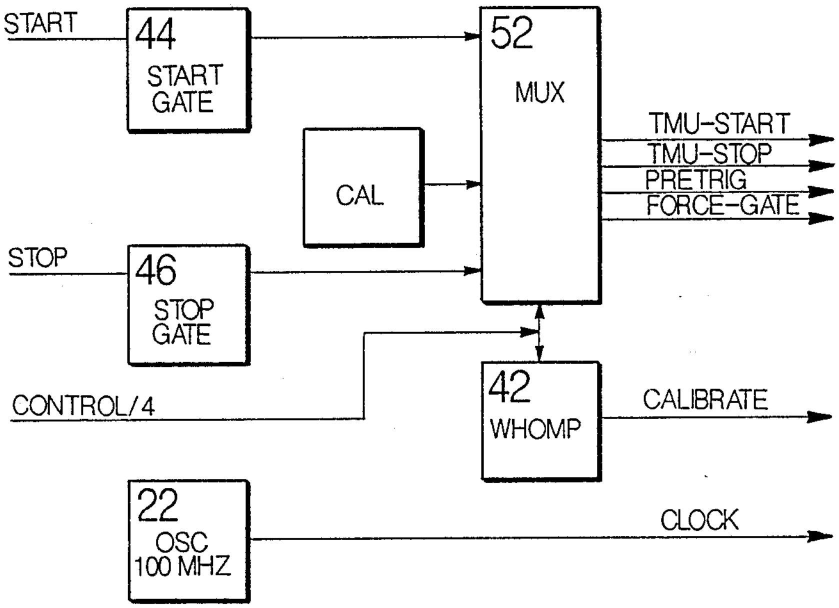
FIG. 5 shows a block diagram of the time measurement calibration circuitry.
Figure 6:
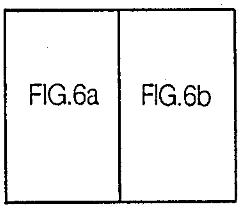
FIG. 6 shows a functional block diagram of the analog time measurement circuitry.
Figure 4:
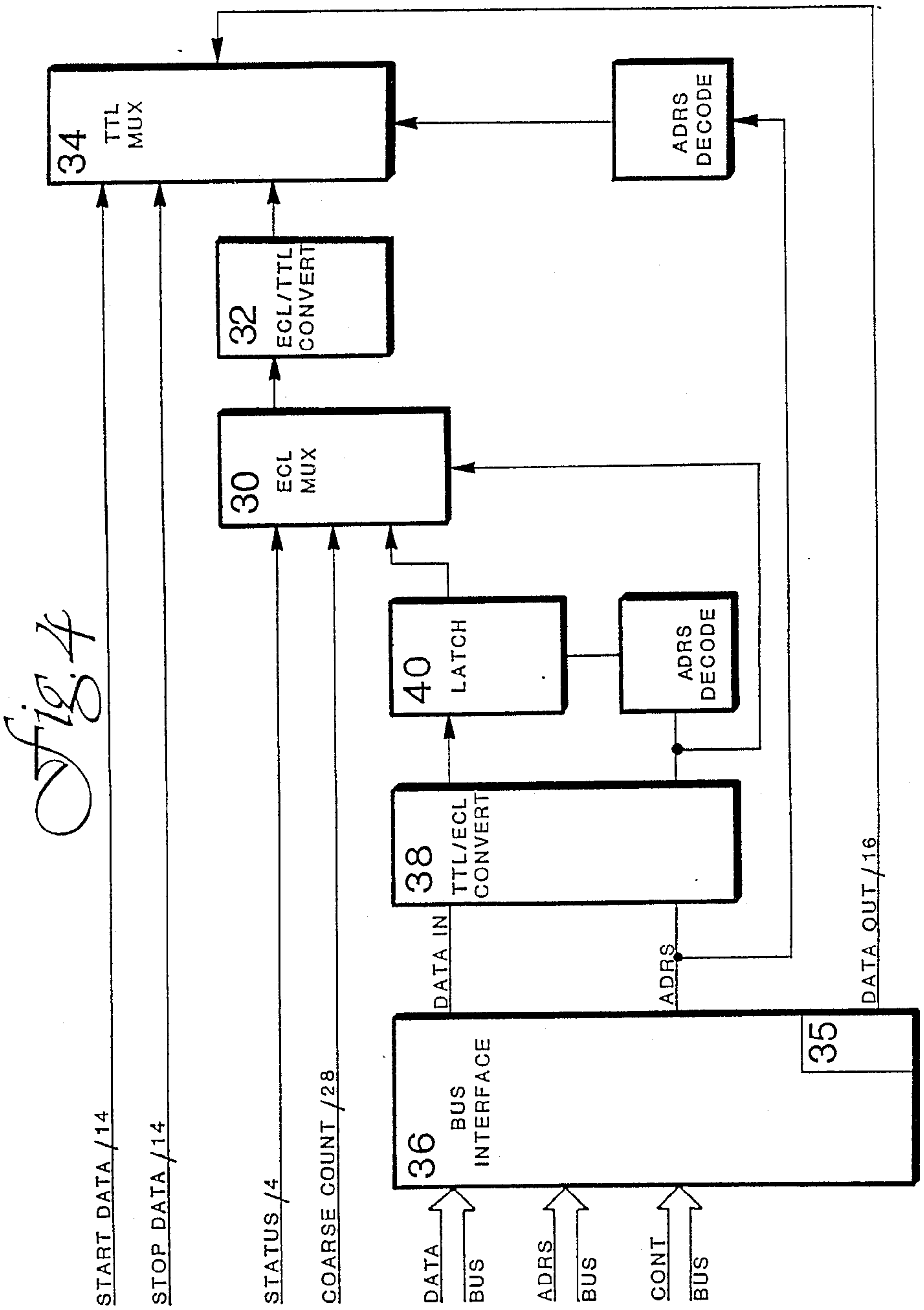
FIG. 4 shows a block diagram of the time measurement interface circuitry.
Figure 6A:
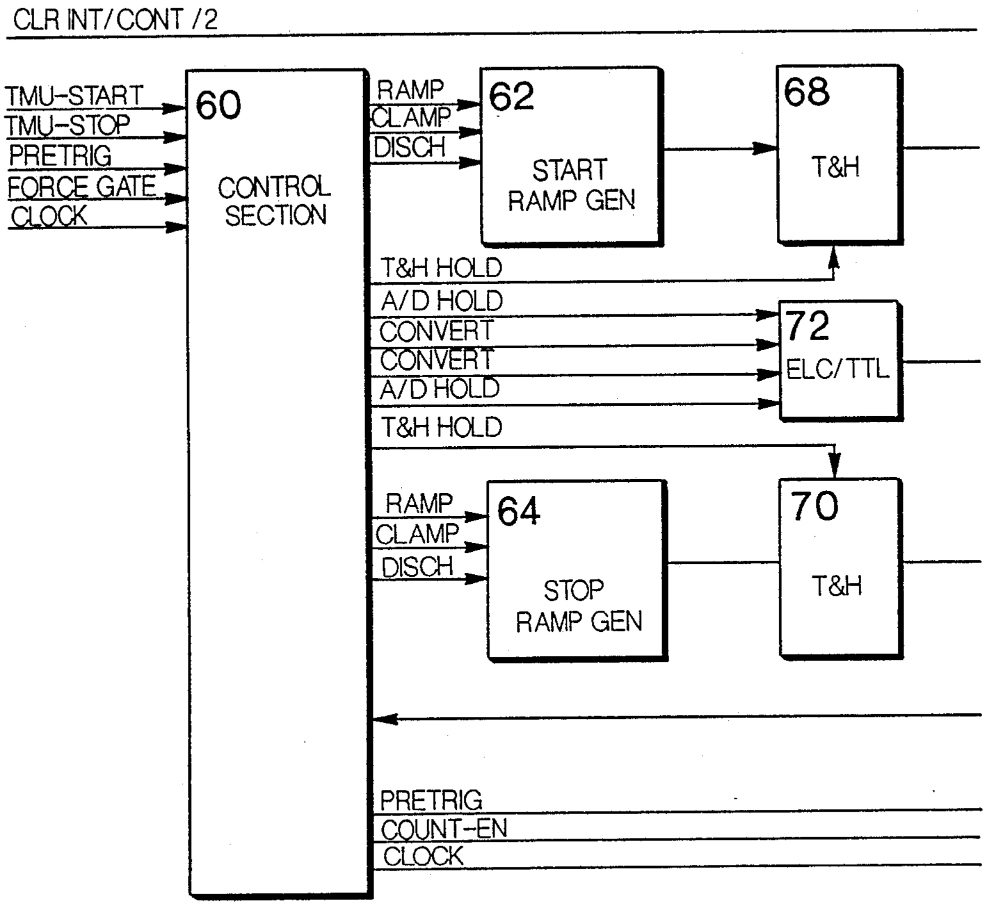
Figure 6B:
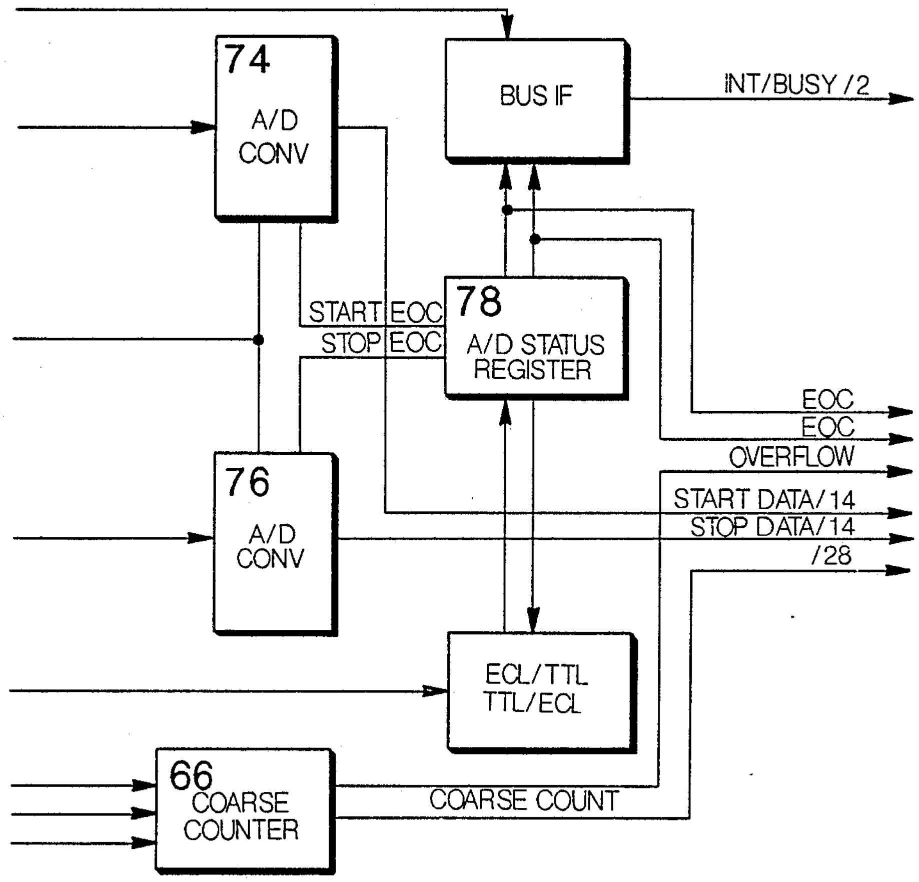
Figure 7A:
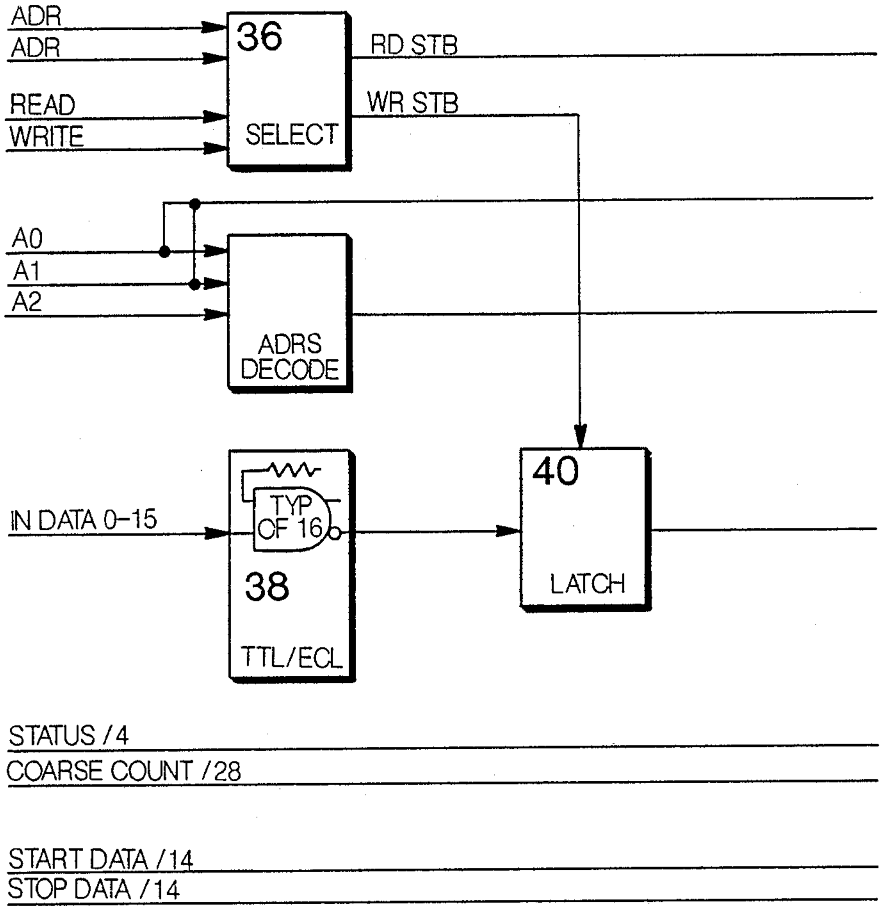
Figure 7B:
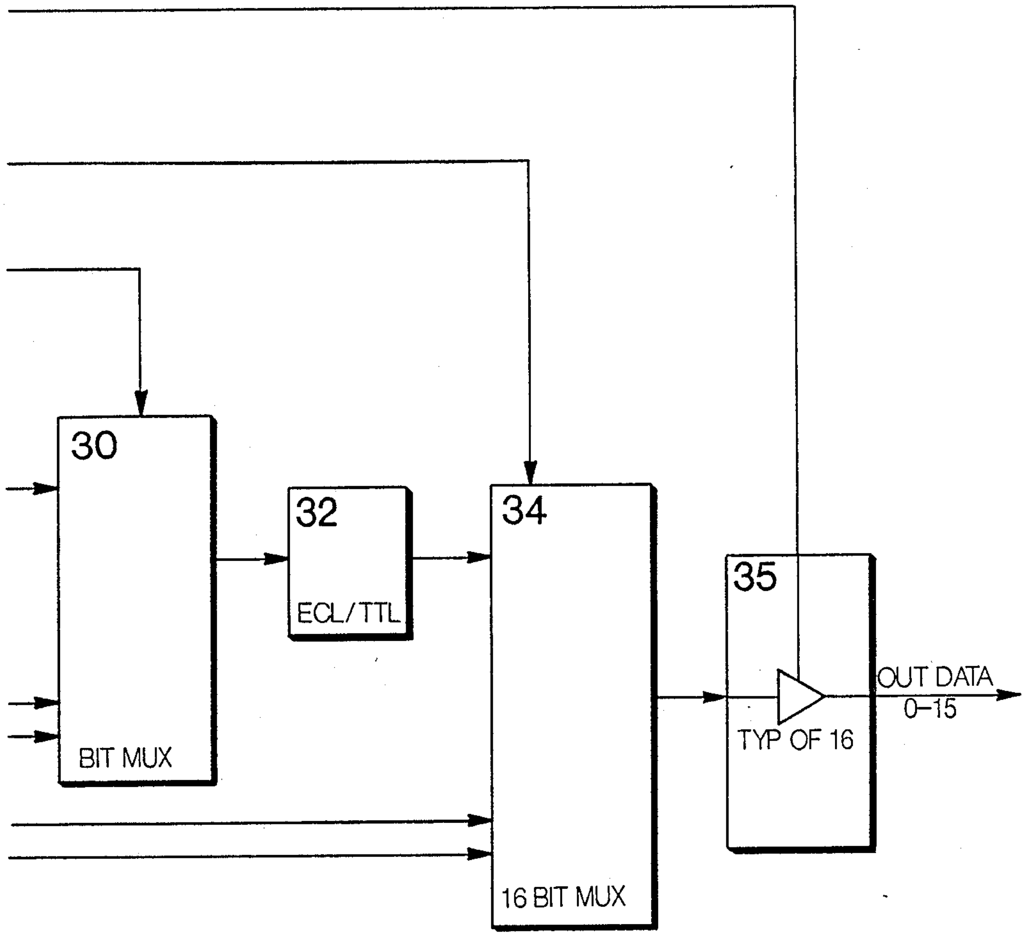
Figure 8A:
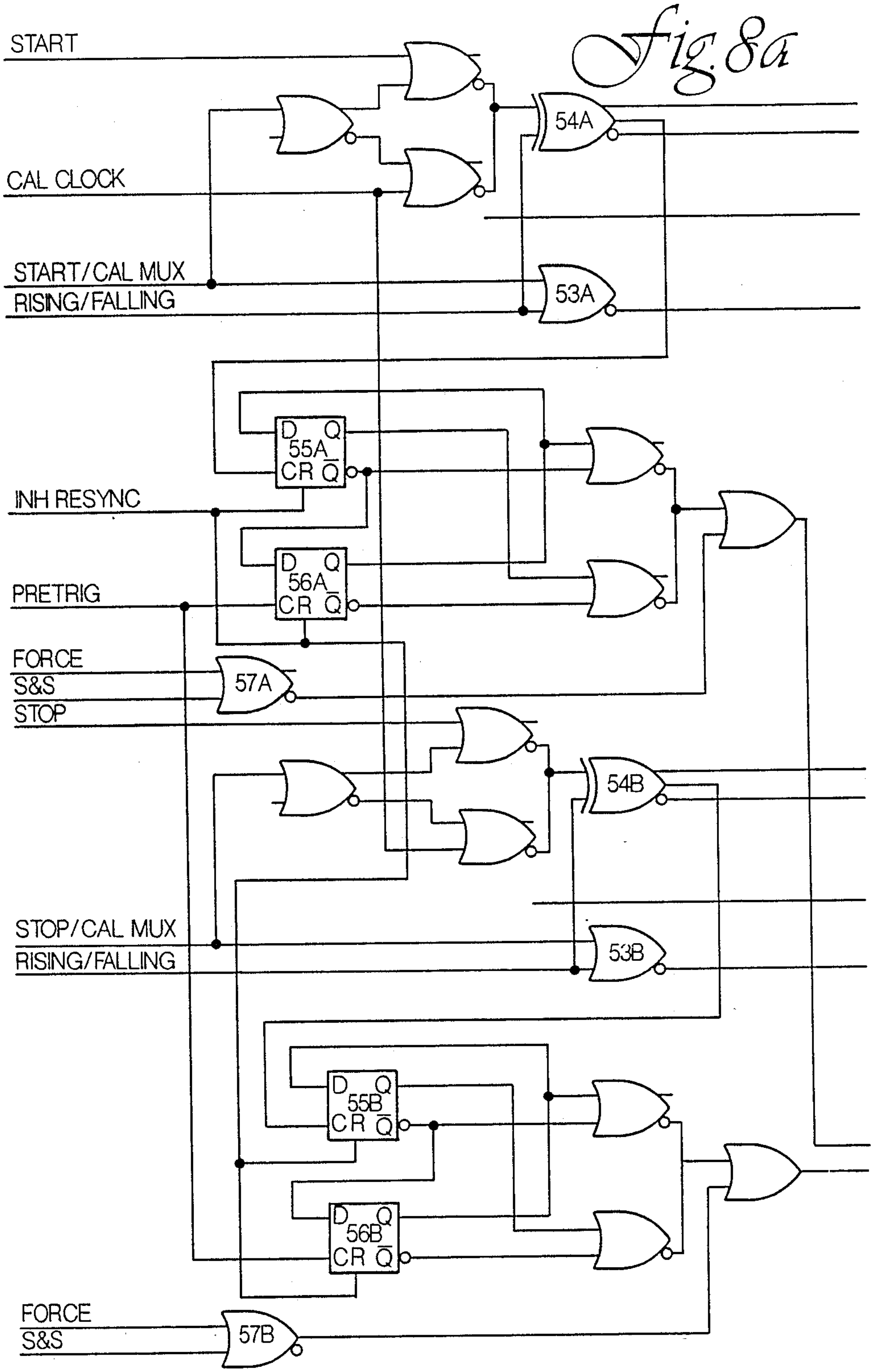
Figure 8B:
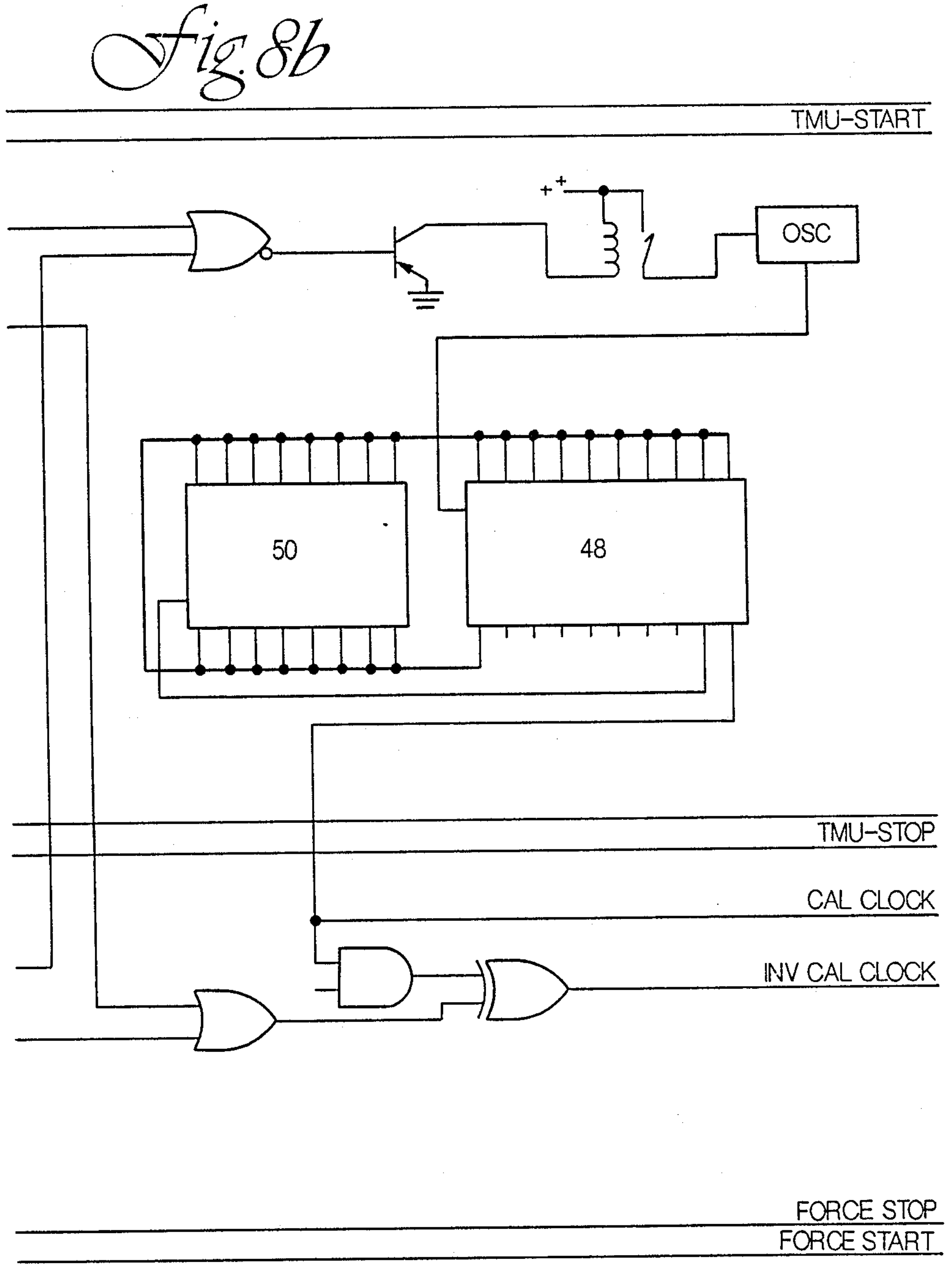

Turning attention next to FIGS. 4, 5 and 6, generalized block diagrams are shown of the circuitry contained on printed circuit boards 14, 16 and 20. Corresponding detailed schematic diagrams of this circuitry are also respectively shown at FIGS. 7, FIG. 8 and FIGS. 9A–9F. In lieu of describing the invention's operation relative to the detailed circuitry, the following description will proceed with respect to the generalized block diagrams of FIGS. 4, 5 and 6, with periodic mention, as necessary, to the corresponding detailed circuitry of FIGS. 7, 8 and 9.

Figure 7:
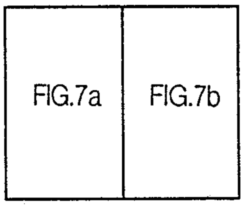
FIG. 7 shows a detailed schematic diagram of the time measurement interface circuitry of FIG. 4.

Referring to FIG. 4, a generalized block diagram is shown of the interface circuitry 20, the detailed schematic diagram of which can again be seen in FIG. 7. Generally, it operates as a logic level conversion board to convert the various transistor transistor logic (TTL) signals to emitter coupled logic (ECL) signals to interface the calibration 16 and measurement circuitry 14 to one another and to interface with CPU 2 and externally produced signals. These functions are generally designated by way of the dotted line segmentation shown.

That is, the ECL/TTL multiplexing and ECL/TTL conversion are achieved by way of the ECL multiplexer 30, ECL/TTL converter 32 and TTL multiplexer 34 which are coupled by way of the data output buffer 36 to the bussed interface 18 and CPU 2. In particular and depending upon the selected mode, the multiplexer 30 appropriately select the START/STOP ramp control signals which are converted and coupled to the measurement circuitry 14 by way of multiplexer 34. These signals define whether the first measured event was a START or STOP condition and when the START/STOP ramps are to be measured relative to the master clock. Otherwise, the 14 bits of TTL data corresponding to the measured voltages developed by the START and STOP ramp circuitry are separately coupled via multiplexer 34 and the output buffers 35 to the CPU 2. Coarse count data is separately coupled to the output buffers 35.

TTL level control signals, in turn, are coupled from the CPU 2 and front panel to the bus interface 36 and TTL/ECL converter 38 where four bits of operator entered internal control data are ECL level shifted via a number of NAND gates before being latched at the latch 40 and selected by way of multiplexer 30.

In the presently preferred embodiment, only four bits of control data are stored in the latch 40 which data bits define the selected mode of operation. These control bits determine the flow of measured data through the multiplexer 34 to the CPU 2. In short, the interface circuitry 20 controls the transfer of data between the calibration and measurement circuitry 14 and 16 and to the CPU 2. Although too ECL/TTL level logic circuitry is presently used, it is to be appreciated other circuit types at other levels may equally be used.

Figure 8:
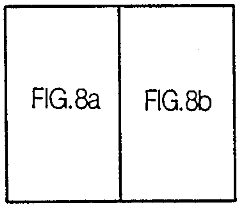
FIG. 8 shows a detailed schematic diagram of the time measurement circuitry.
Figure 9A:
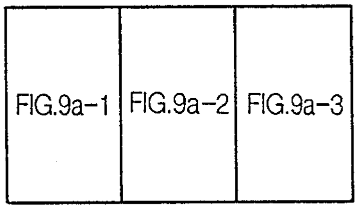
FIG. 9, comprised of FIGS. 9A through 9F, shows a detailed schematic diagram of the analog event measurement circuitry.

Referring next to FIG. 5 and the corresponding schematic diagrams of FIG. 8, a block diagram is shown of the calibration circuitry and related control which couple pseudorandomly generated sample event signals to the measurement circuitry 14 whereat the START/-STOP circuitry produces the 16,000 data points stored in the fine count memory 4.

Assuming the internal calibration mode is selected, the CPU 2 first turns off the whomper circuitry 42 which is used during external calibration and which will be described hereinafter. With the operator's further definition of whether the START and STOP events are to be measured relative to a rising or falling clock edge via control signals 43, the START and STOP calibration gates 44 and 46 are clocked to enable the ramp generator circuitry of FIG. 6. The START/STOP counters 48 and 50 are next enabled by the CPU 2 and the front panel/calibration multiplexer 52 couples pseudorandomly produced START/STOP sample event signals produced thereby to the measurement circuitry. There the START/STOP track and hold conversion circuitry captures the sample magnitudes representative of the linear charge characteristics developed by the measurement circuitry for each sample. which magnitudes are clamped and coupled via the TTL multiplexer 34 to the CPU and FCM 4.

Relative to the present calibration methodology, it is to be noted ring counter 48 and binary counter 50 are started via relay coupled control signals (reference FIG. 8) and operate to successively produce 128 START and STOP events of random interval width and random spacing from one another. The counters repeat themselves every 256 cycles, but otherwise essentially operate in a pseudorandom or so-called "Monte Carlo" fashion. The track and hold and conversion circuitry, in turn, produce multiple measured analog charge values for each value ultimately plotted into memory, which values are arranged and plotted into the FCM by the CPU 2. These calibrated values ultimately are used to determine the duration of unknown measured events by comparison thereto.

In the presently preferred embodiment, some 200,000 START/STOP sample occurrences are thus generated and fitted to a linear ramp in some 90 seconds. This calibration need not be repeated either, except where environmental conditions may change and induce drift or intolerable error as reflected by changes in the displayed standard of deviation or range values. In any case, the calibration is easily performed by way of the measurement circuitry itself and thus any errors or inconsistencies which might otherwise occur between separate calibration and measurement circuits are overcome and discounted, since the present arrangement utilizes the identical circuitry for both operations.

If an external calibration mode is selected, the whomper circuitry 42 is enabled. It operates to produce edge signals which are coupled to the test fixture, which typically comprises a test stand and associated coupling leads to the present time measurement apparatus. In two separate operations, the ends of the coupling leads from the test stand are connected between the external calibration output at the front panel and the START and STOP input jacks. During each calibration sequence, one hundred sample edge signals are coupled to the test fixture and the throughput time delays are measured and averaged for each sampling. The averaged values are then stored in memory, later to be factored into the internal computations of the measured events.

In passing, it is also to be noted that the all signal path lengths are controlled to tolerances of 0.001 inches to assure that inconsistencies do not exist between the START/STOP channels which might result in accrued error, otherwise negated by the present internal/external calibration techniques. Although too calibration may be achieved in 90 seconds, a warm up or crystal stabilization time of ½ hour is recommended, consequently the mentioned use of separate power switches. Again though calibration need only occur once, upon warm up, although the equipment may be recalibrated prior to any given measurement to minimize against inconsistent environmental conditions between the times of calibration and measurement.

Returning attention to FIGS. 5 and 8, FIG. 8 essentially being replicas of the START and STOP conditions, provisions are made in the logic circuitry to separately determine which clock edge (i.e. rising or falling) is selected to turn on the ramp generator circuitry. Accordingly, the OR and XOR gates 53*a,b* and 54*a,b* of FIG. 8 control which edge is selected relative to the internal calibration clock or the external START input. Also provided are the pretrigger and re-synchronized trigger latches 55*a,b* and 56*a,b* which, depending upon the programmed trigger events, arm or clear the circuitry to capture successively following events. Otherwise, OR gates 57*a,b* determine which external START or STOP input is measured first relative to the selected trigger condition. Consequently, the internal or period between intervals may be measured.

Figure 10:
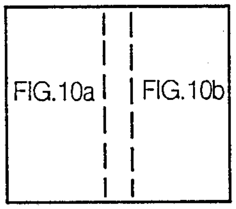
FIG. 10 shows a timing diagram of a typical measurement sequence.
Figures 1, 9A:
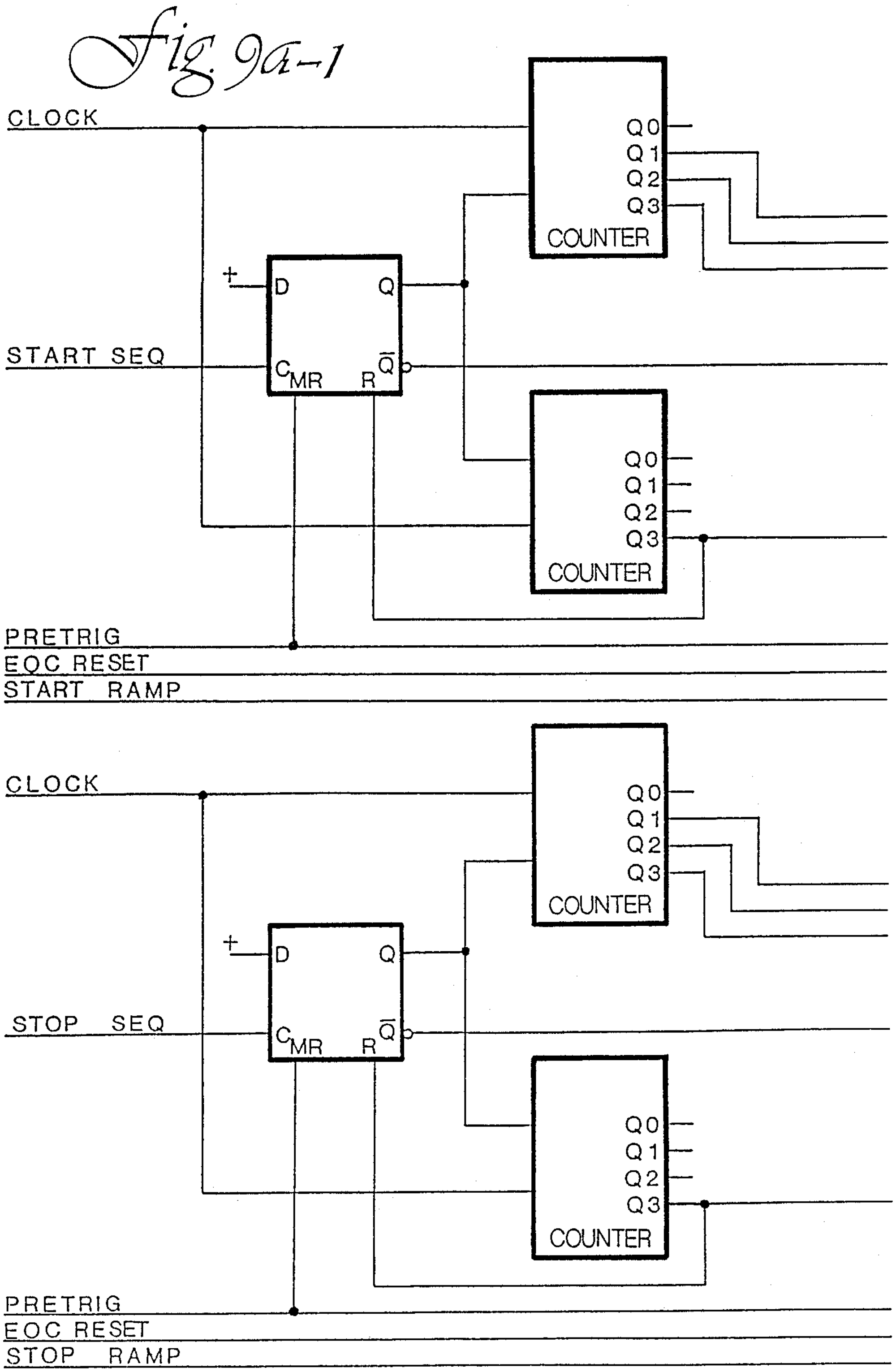
Figures 2, 9A:
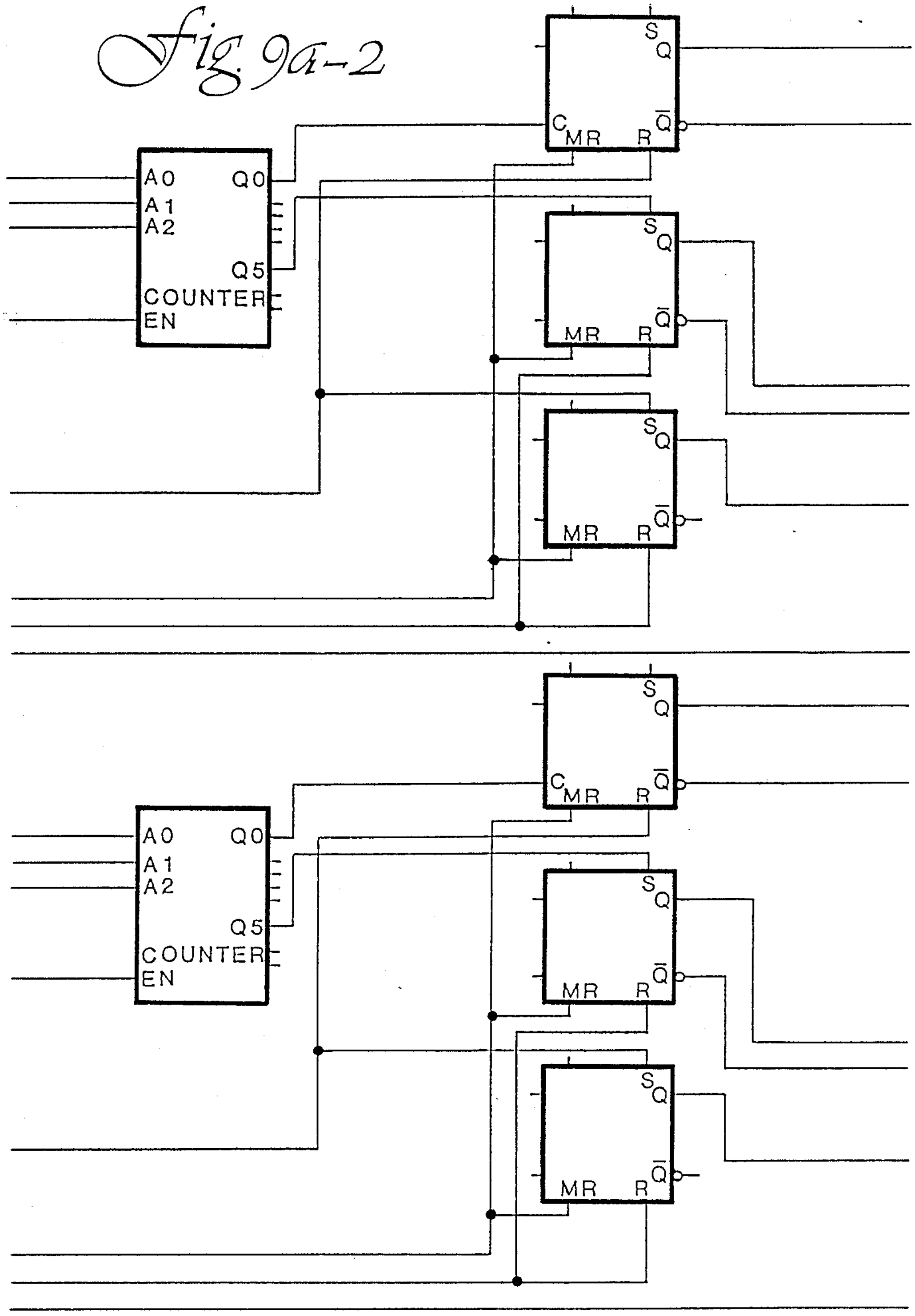
Figures 3, 9A:
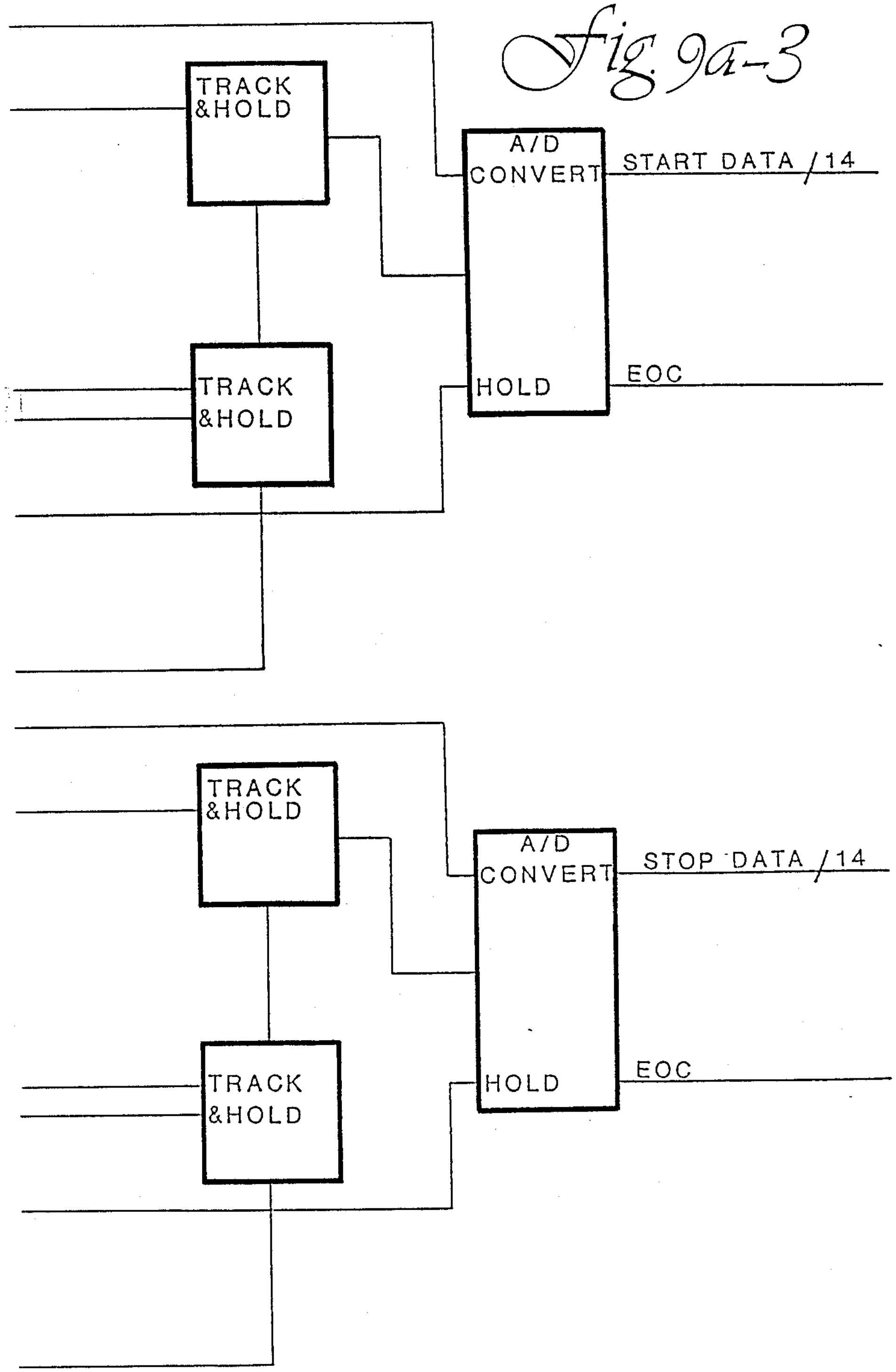
Figure 9B:
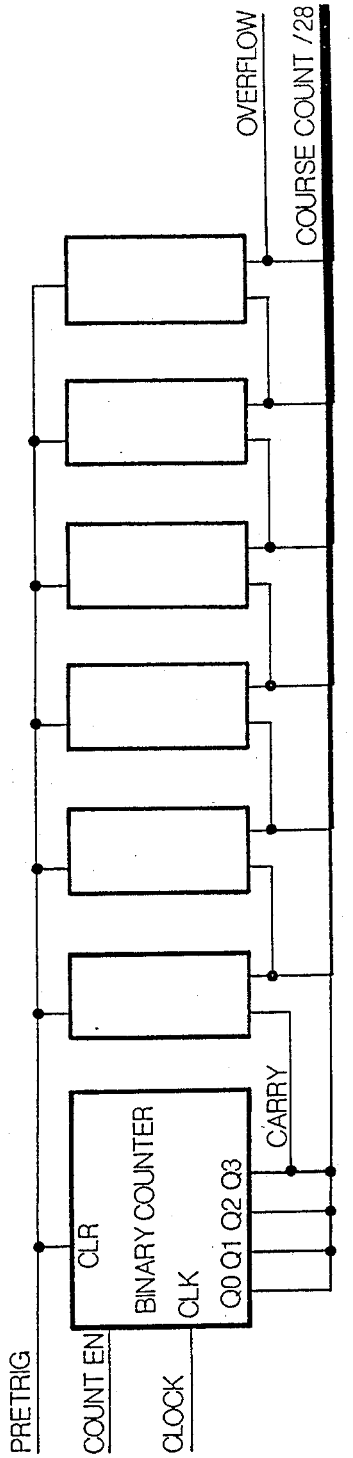
Figure 9C:
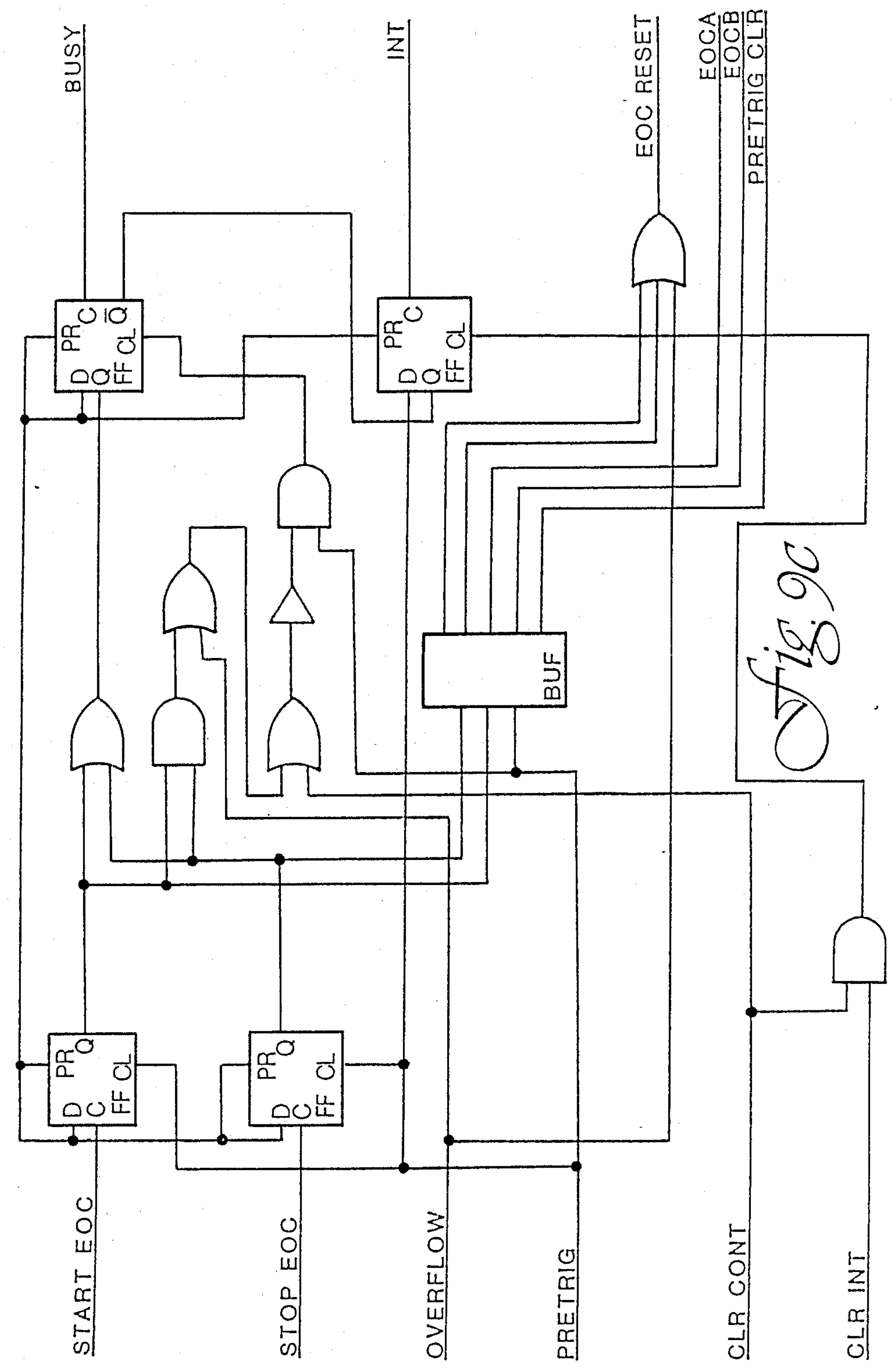
Figures 1, 9D:
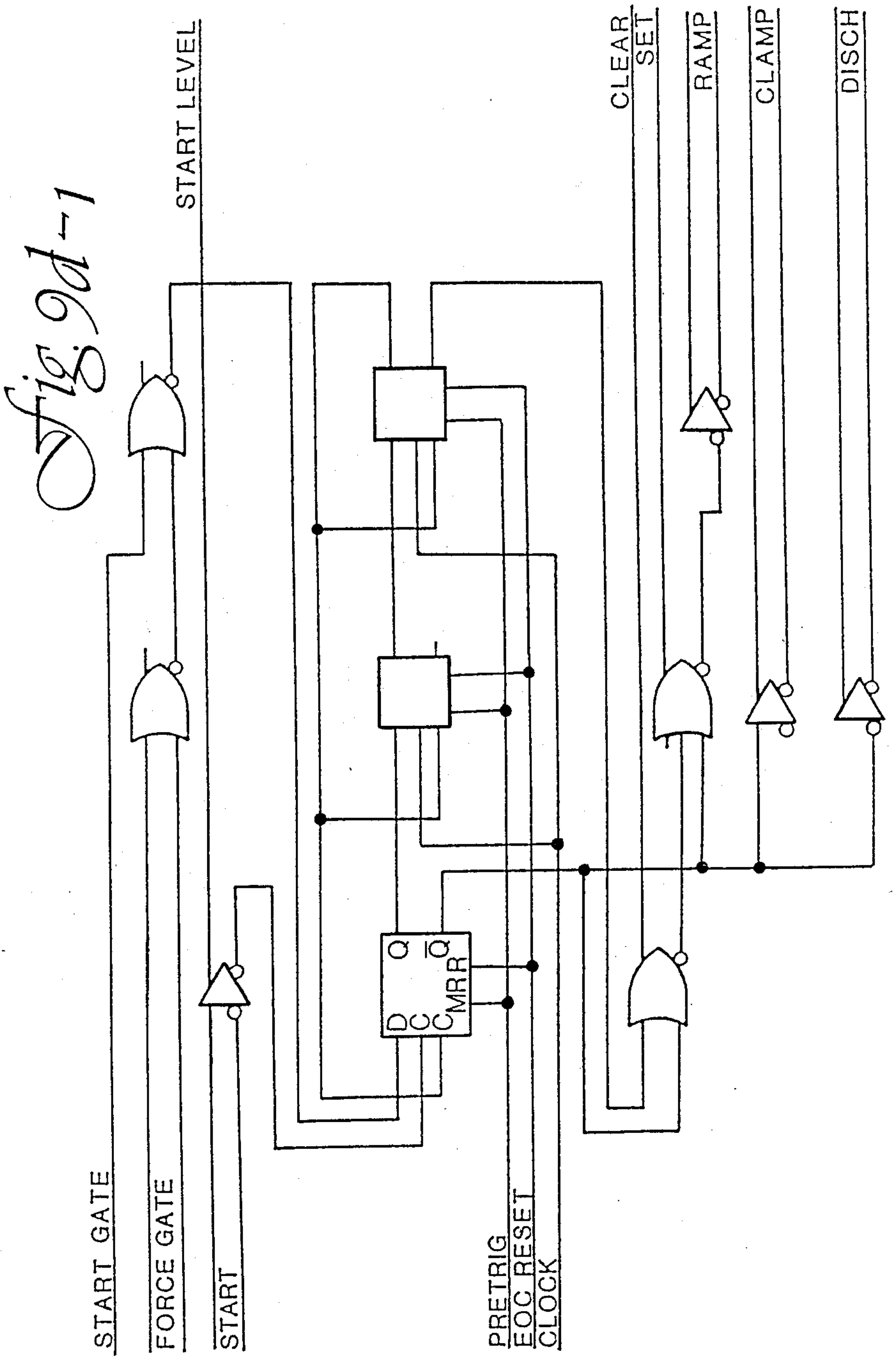
Figures 2, 9D:
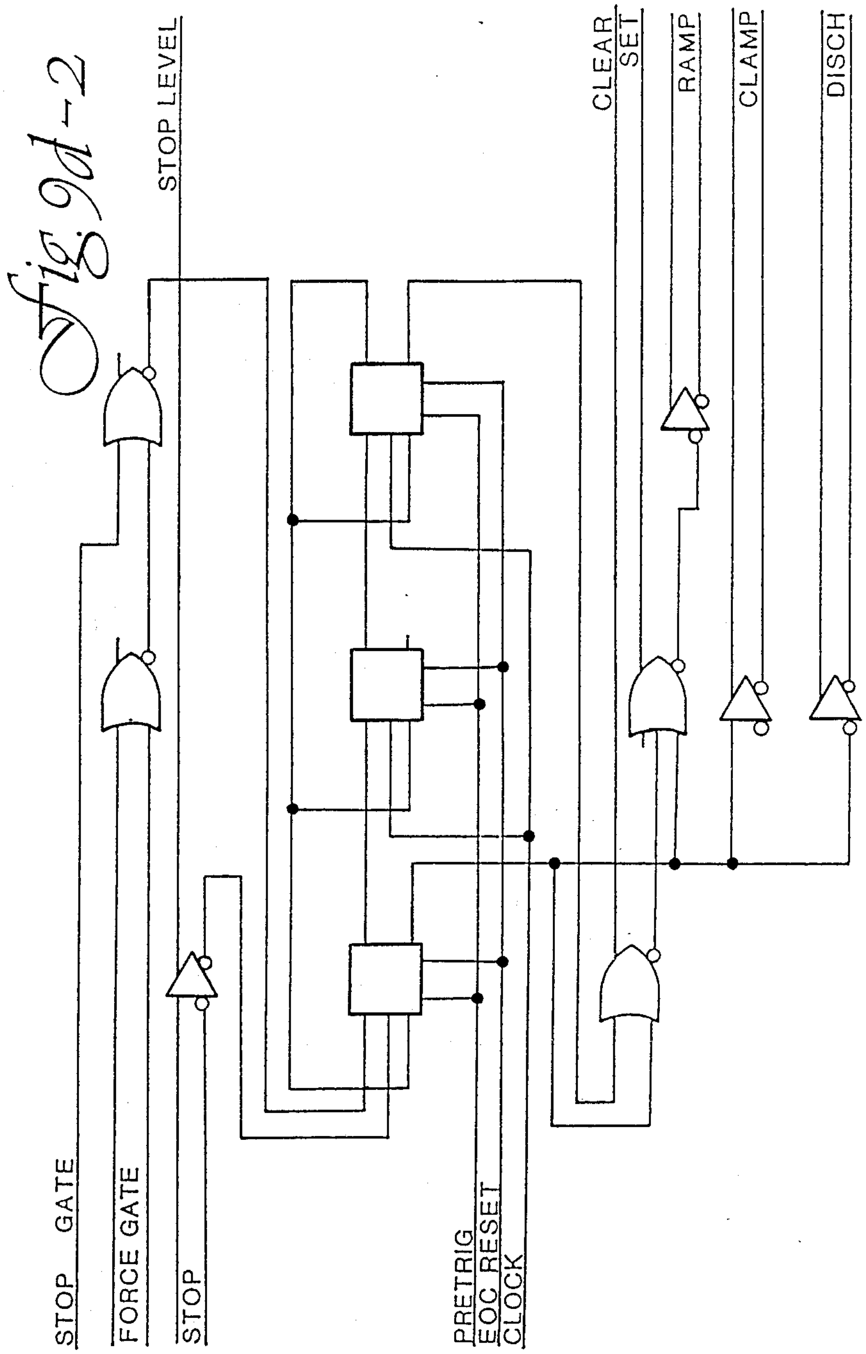
Figure 9C:
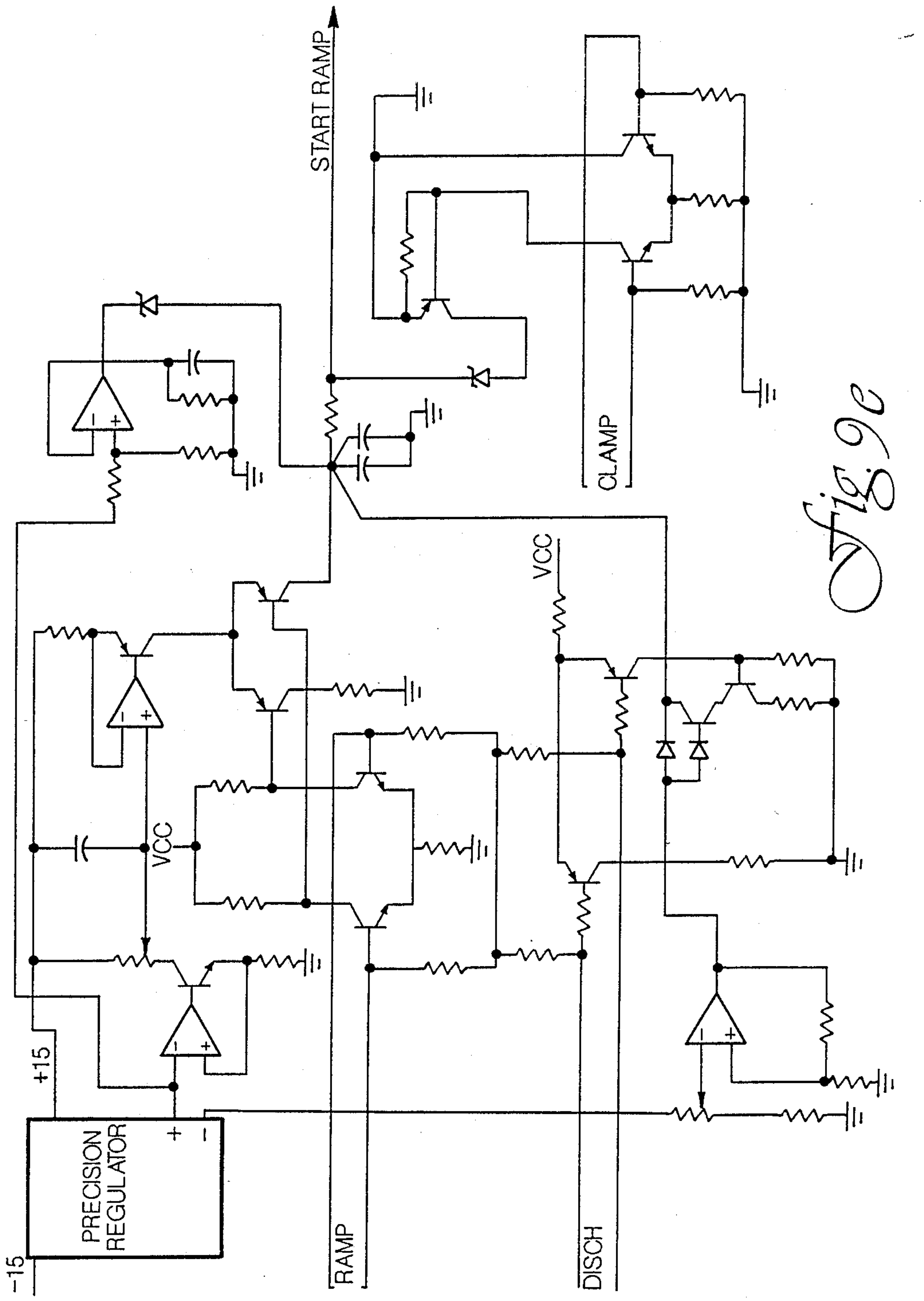
Figure 9F:
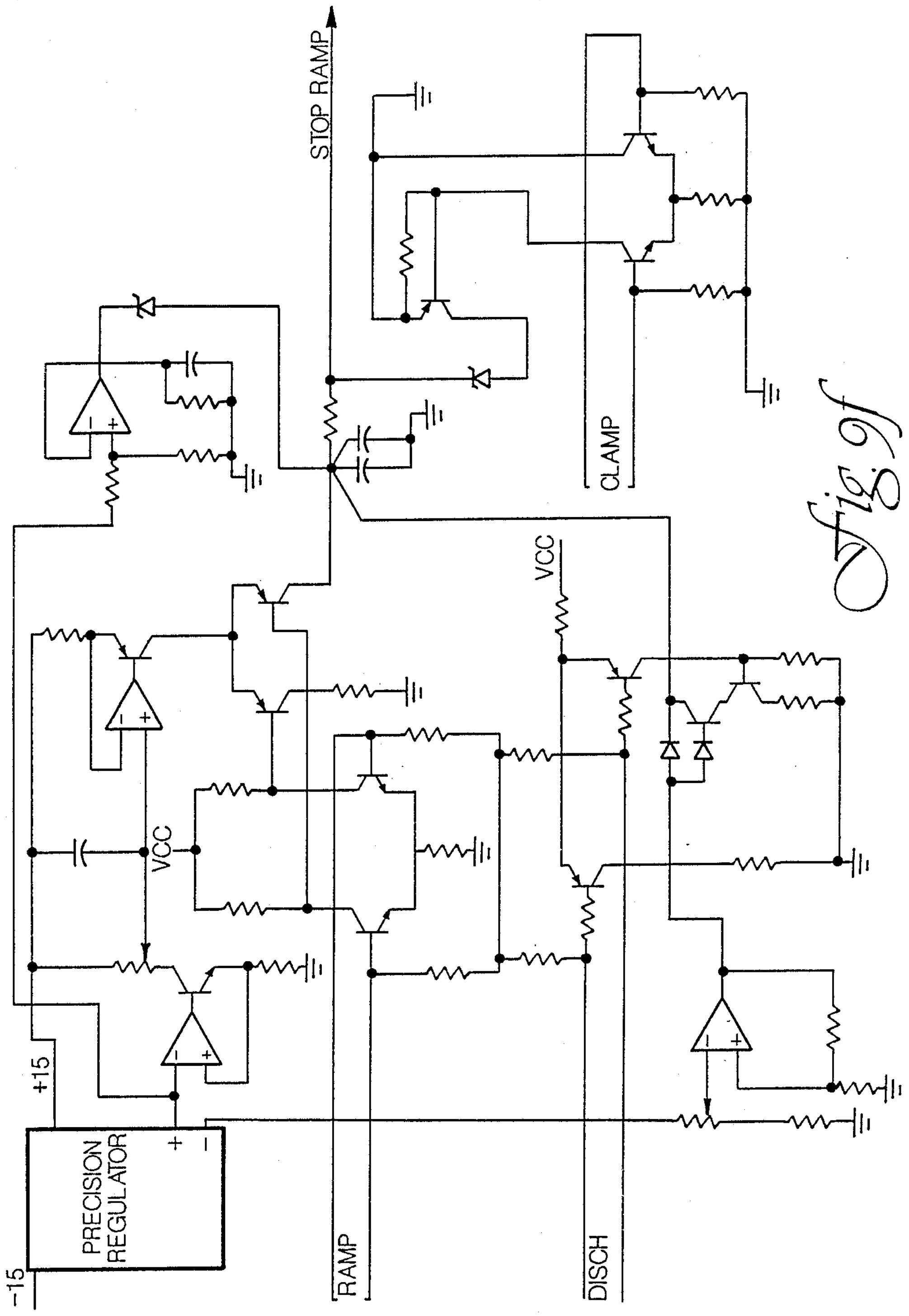
Figure 10A:
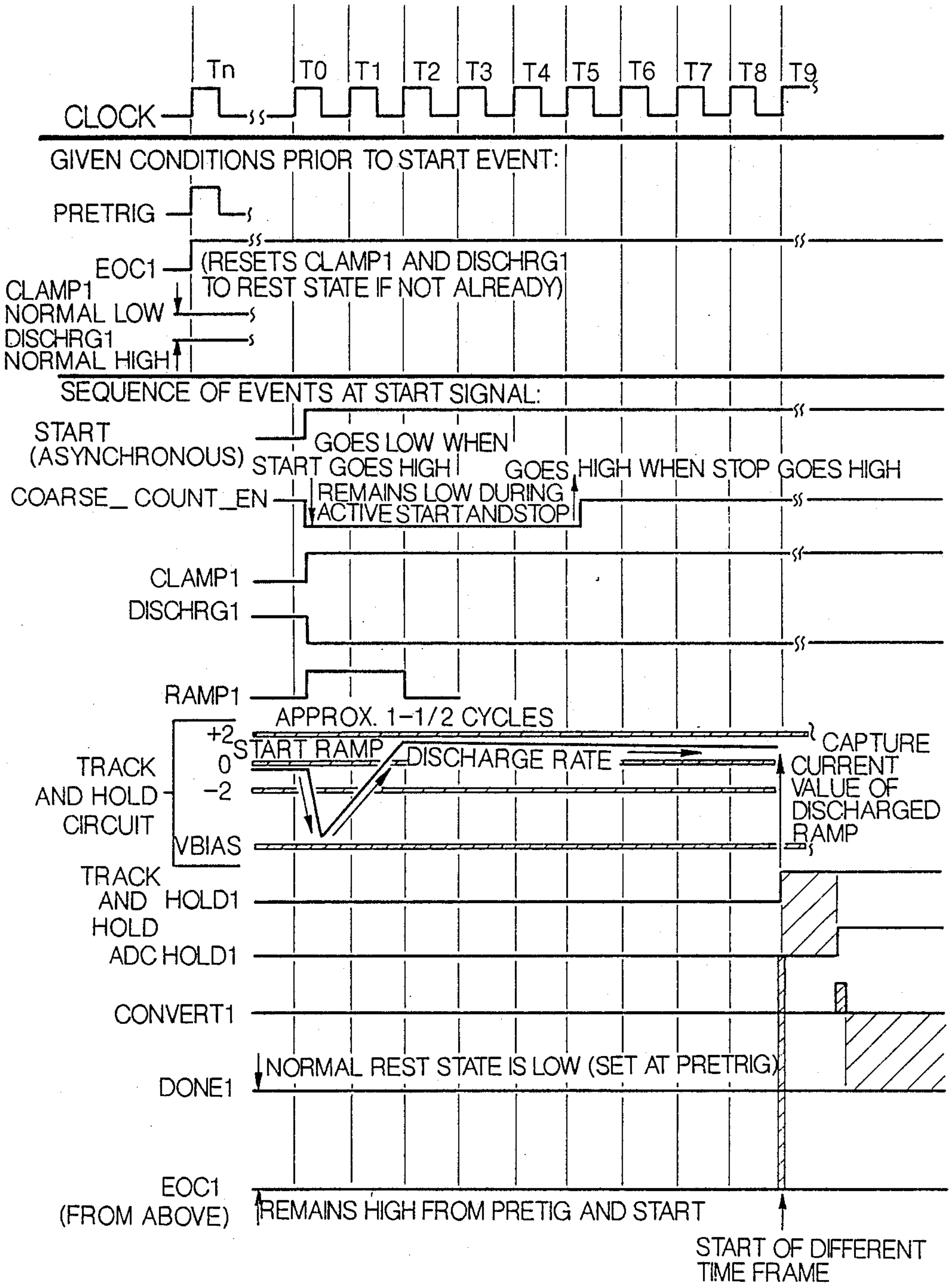
Figure 10B:
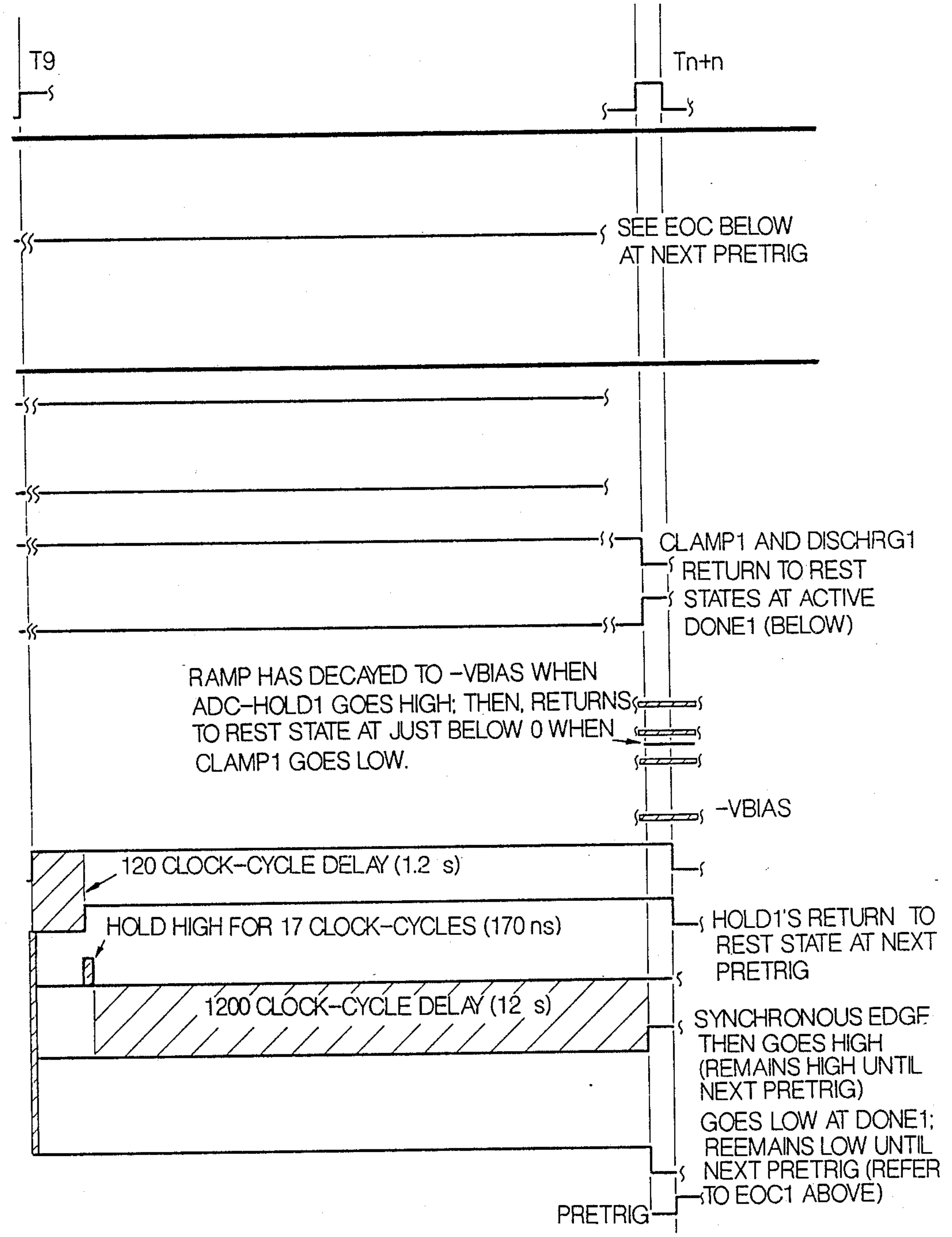
Figure 11A:
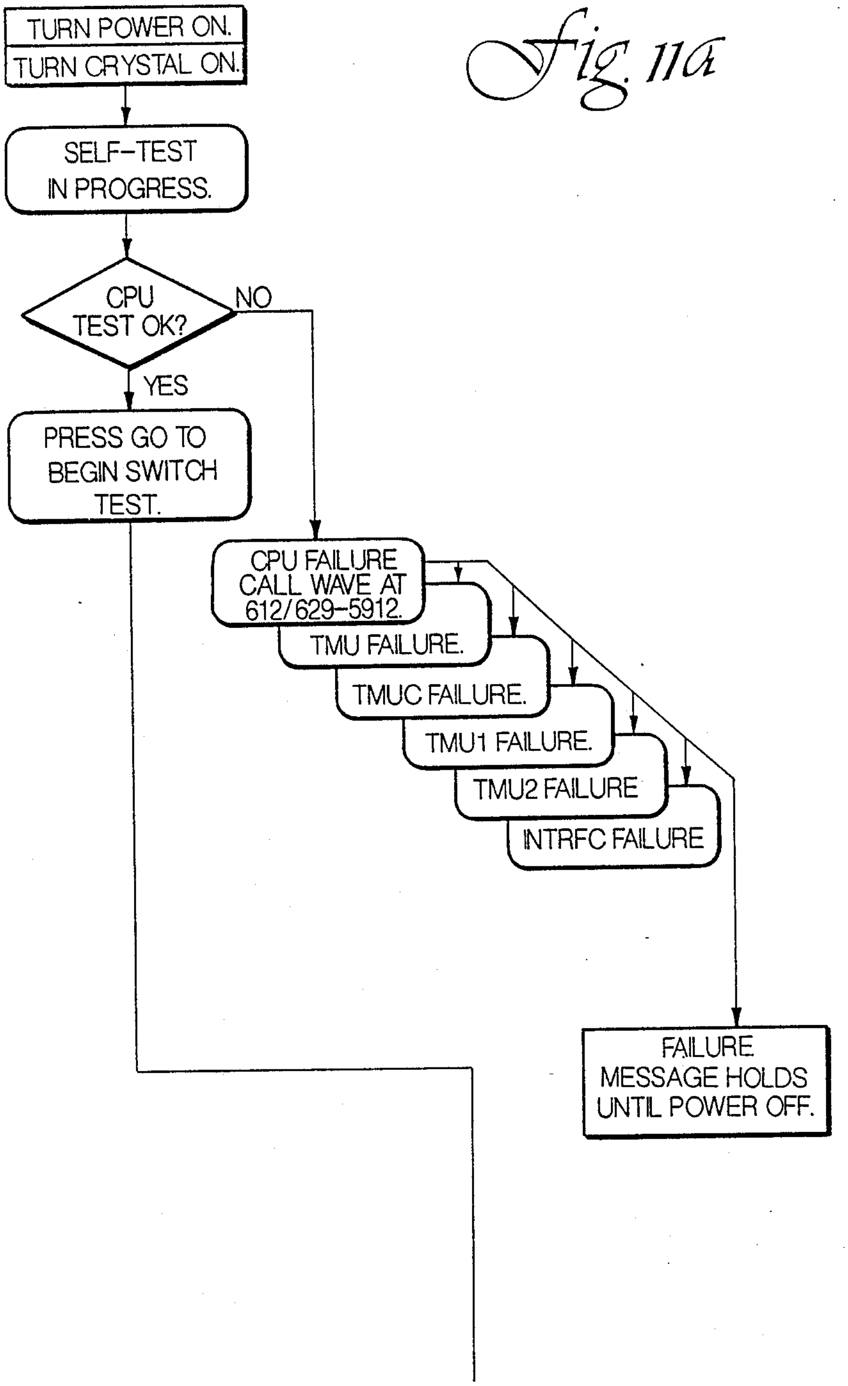
Figure 11B:
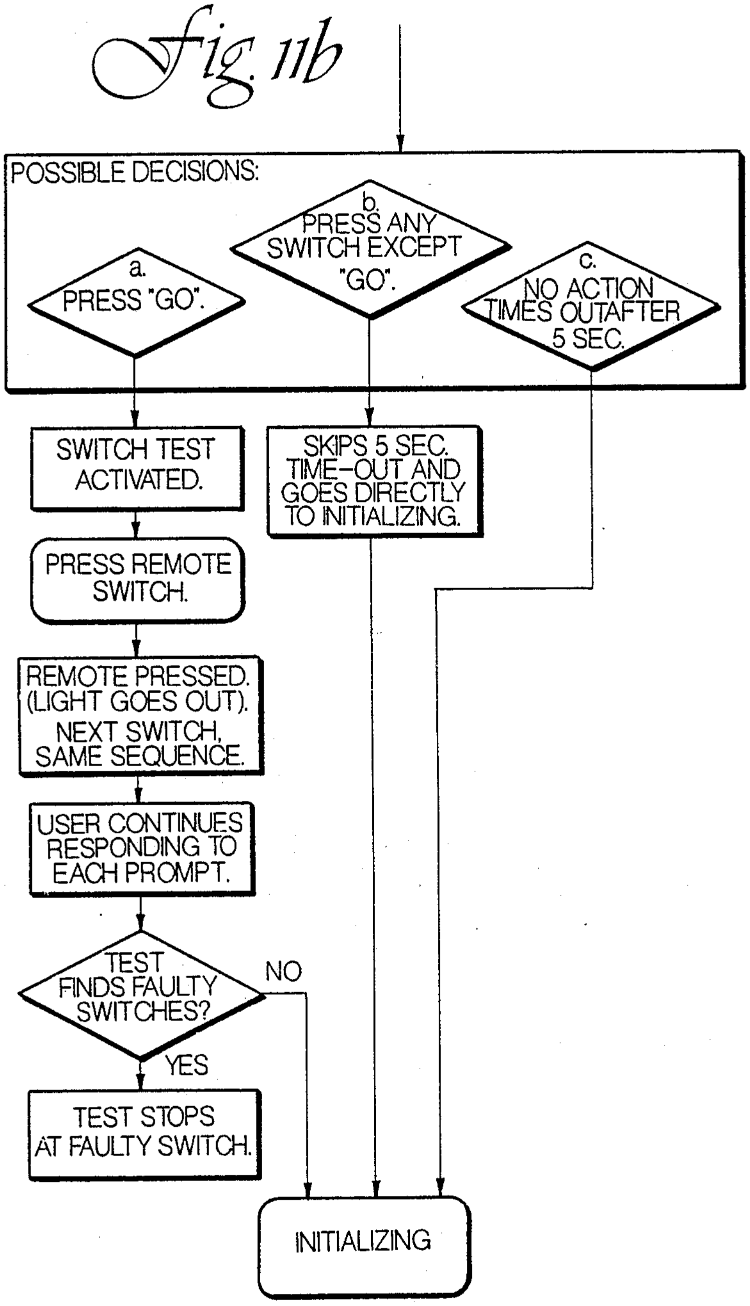
Figure 12A:
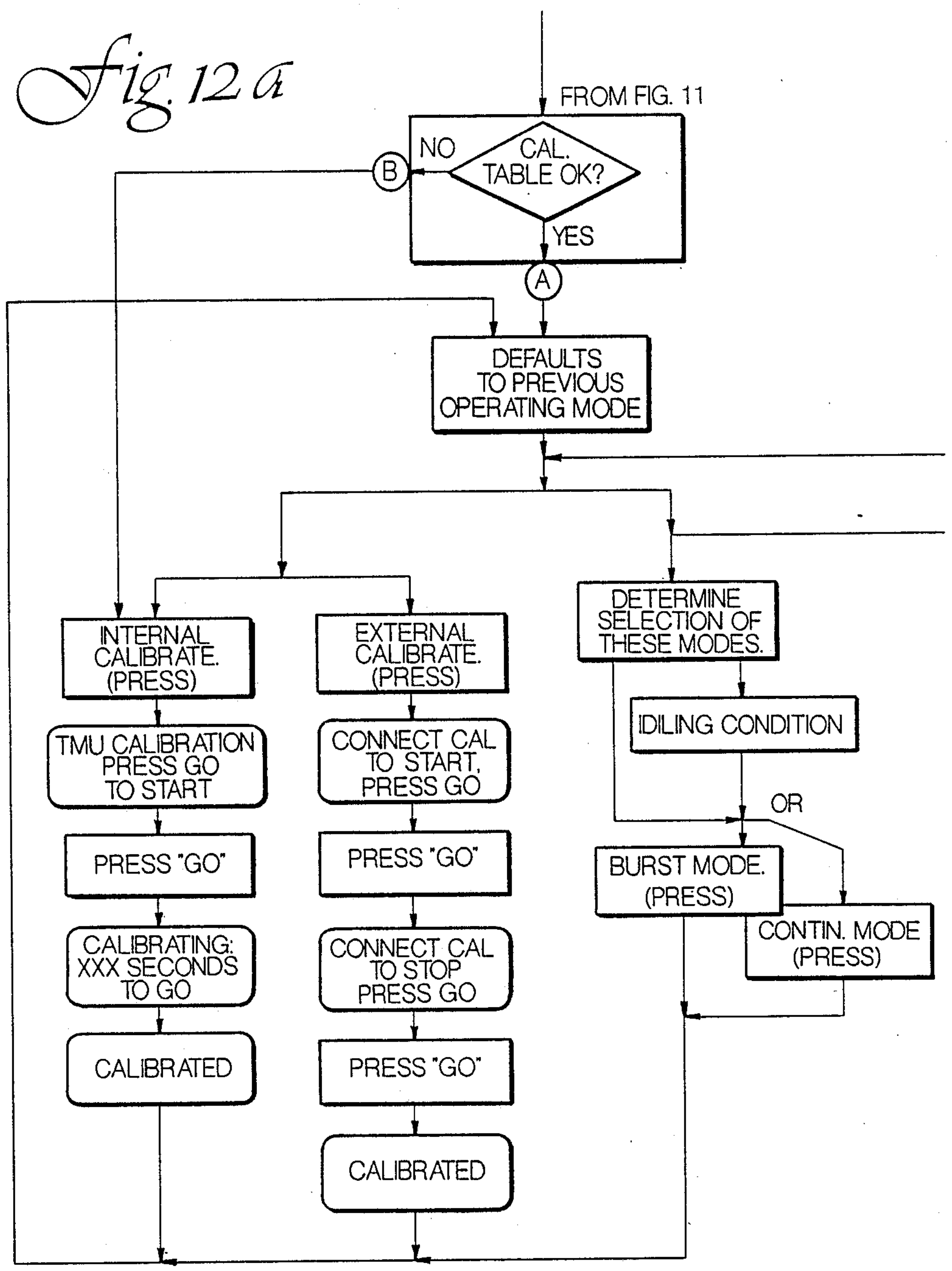
Figure 12B:
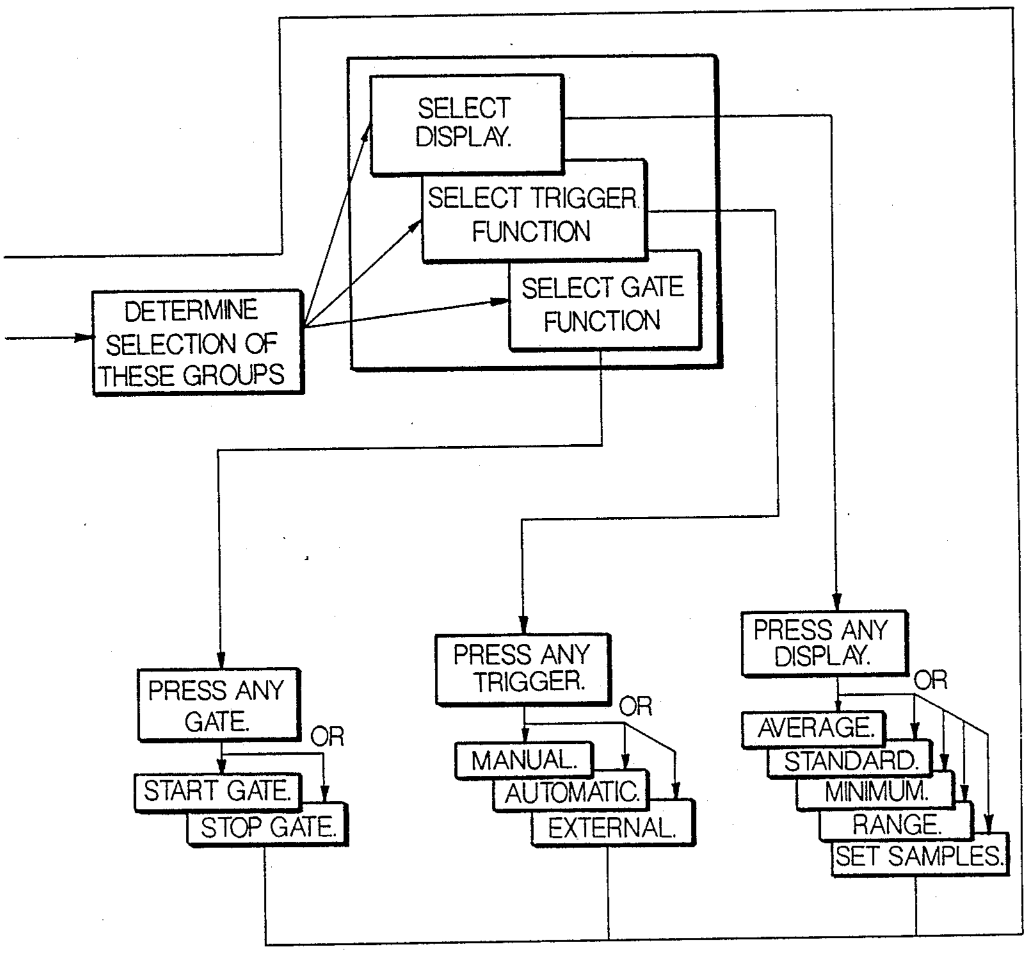

Relative to the measurement circuitry, attention is next directed to the generalized block diagram of FIG. 6, along with the timing diagram of FIG. 10 and the related detailed schematic diagrams of FIGS. 9A to 9F. This circuitry generally controls the STARTING and STOPPING of each ramp generator (FIGS. 9C, D and E, F), the tracking and holding or clamping of the accumulated charge or voltage during each START/STOP interval (FIG. 9A), the analog to digital conversion of the ramp values and the measurement of the coarse count interval (FIG. 9B).

Depending upon the selected mode and whether a START or STOP event is the first to occur, although a START event will be presumed, the START event is coupled by way of the control circuitry 60 (reference also FIGS. 9C and D) to the START and STOP ramp generators 62 and 64 (reference also FIGS. 9E and F) which as previously mentioned and relative to the master clock are initiated upon the occurrence of the event to discharge their related capacitors and begin recharging these capacitors until the occurrence of the next rising or falling clock edge as specified by the operator. Where a burst or continuous sampling mode is programmed and depending upon the selected trigger, associated registers and counters (FIG. 9A) clock the track and hold and conversion circuitry over multiple events.

Otherwise, the coarse counter 66 (reference FIG. 9B) is also enabled and begins to count each whole master clock cycle until the occurrence of the first clock signal subsequent to the STOP signal. With the selected first rising or falling clock edge and assuming a START event occurs first, the corresponding track and hold circuitry 68 is enabled to clamp the accumulated charge or voltage value which, in turn, is converted upon enabling the ECL/TTL generator 72 and 14 bit A/D converter 74 and stored in status register 78. Similarly, the STOP value is obtained from track and hold circuitry 70 and A/D converter 74 and temporarily stored in status register 78 before being coupled via the interface circuitry 20 to the CPU 2. The coarse counter 66 data is also coupled to the CPU along with the control signals defining whether the STOP or START was the first occurring event. Depending too upon the duration of the measured event, if it exceeds approximately 2.5 seconds, an overflow signal may be produced and coupled to reset the circuitry; otherwise, the CPU per its microinstructions computes or stores the corresponding programmed values. Also and as each START/STOP event occurs, it is counted (see FIG. 9C) along with any pretrigger or overflow, and used to reset the circuitry prior to the next interval to be measured.

Figure 11:
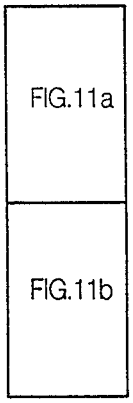
FIG. 11 shows a flow chart of the equipment's power-up and diagnostics.
Figure 9D:
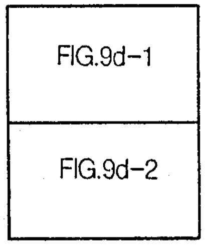
Figure 12:
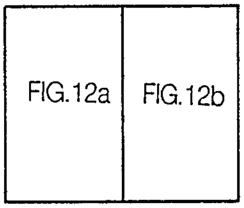
FIG. 12 shows a flow chart of the calibration/mode select operations and the display, trigger and gate group select operations.
Figure 3A:
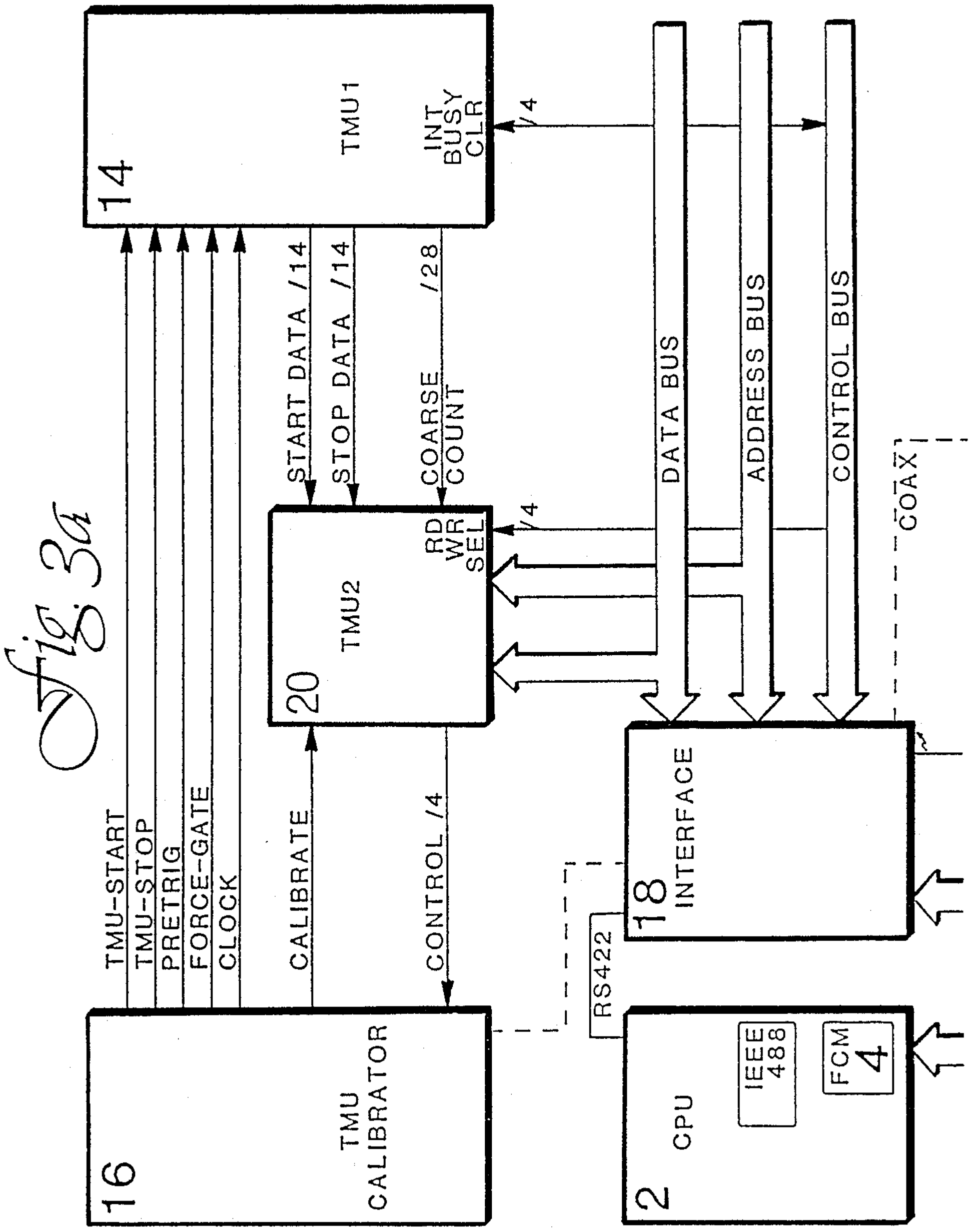
Figure 3B:
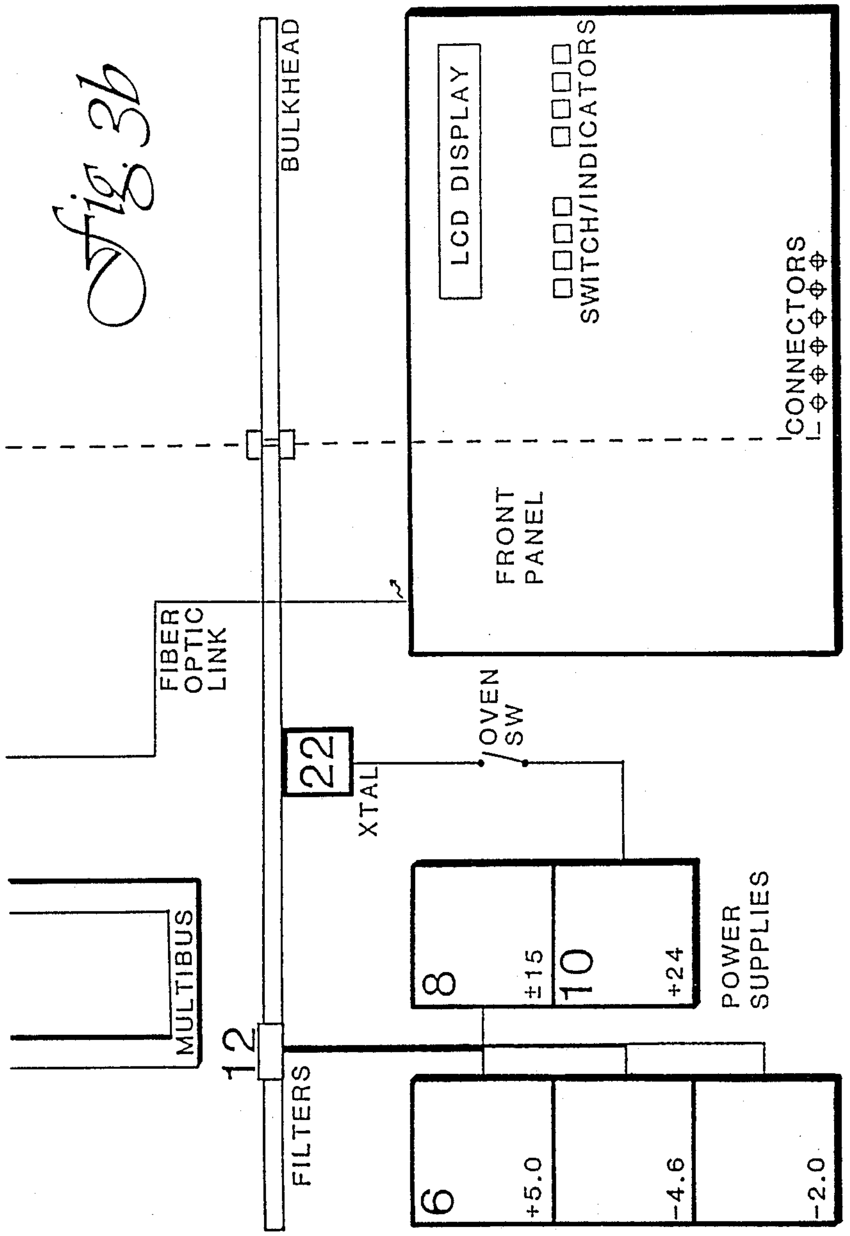

Turning attention next to the software block diagrams of FIGS. 11 and 12, each will briefly be described relative to the operation of the invention during power-up, the calibration/mode selection and the data display operations. Directing attention to FIG. 11, it is to be appreciated the CPU board 2 includes pre-programmed ROM memory where microinstructions are stored for controlling the CPU board 2 during the foregoing operations. As these relate to the initialization of the equipment with the turning on of the system power, a sequence of self-test/diagnostic operations are performed which sequentially exercise the various circuitry and if any tests fail, produce an associated display message indicating where the failure occurred. If no errors are encountered, the operator may alternatively test the condition of the front panel switches and lights by selecting "GO" selectively actuating each switch, while monitoring the condition of the associated pilot lights. Alternatively, with the selection of any of the panel switches, except "GO", the status of the FCM is determined and if not previously calibrated reverts to a self-enabled internal calibration sequence. Alternatively, if no action is taken, after a five second delay, the system confirms the calibrated status of the FCM, preparatory to taking measurements per the previously established operating conditions.

Referring next to FIG. 11, and assuming the FCM was not calibrated, the system reverts to a condition where it may be re-calibrated with the performance of separate external and internal calibrations or the mode may be set. Upon enabling an internal calibration, the apparatus again pseudorandomly produces and averages START/STOP samples until all memory locations of the FCM are loaded. Otherwise an external calibration may be performed.

As mentioned, depending upon the test fixture and conductors used to couple the START/STOP edge events to the circuitry, attendant delays may occur in the conductors, although which can be externally calibrated and discounted by the CPU when later calculating the duration of the measured event. This operation is achieved by selectively coupling each of the conductors between the external calibration output jack and the START and STOP input jacks. Sample START/-STOP signals are generated by the whomp and calibration circuitry 16, measured, averaged and stored in the FCM.

With calibration completed, the operator may select the operating mode which may either be a burst or continuous mode. Regardless which mode is selected, the number of events to be measured is also entered; in the burst mode, a single sampling of the set number of events thereafter occurs, and in the continuous mode, repetitive samplings are thereafter taken on a continuing basis until the mode is reprogrammed. If no mode is selected, the circuitry remains in a default, idle condition.

With the selection of the desired mode, the operator next selects the data to be displayed as per FIG. 12 which may comprise the average pulse width measured for the sample, the standard deviation of the sample, the minimum pulse width measured for the sample, the maximum pulse width measured, the range or difference between the minimum and maximum measurements, and set sample size. Depending upon the display function selected, a corresponding CPU subroutine performs the necessary processing.

Depending upon how the operator wants to arm or trigger the measurement of time intervals, either a manual, automatic or external trigger may be selected. The selection of a trigger arms the circuitry to measure the next occurring rising or falling pulse edge. Depending then upon which condition is to be measured first or if at all, either of both of the START, STOP gate conditions may be selected and by which inputs from either or both of the START/STOP conductors at the face panel are separately measured.

While the foregoing description has been directed to the presently preferred embodiment, it is to be appreciated the modifications and improvements may be made to the invention by those with skill in the art. Accordingly, the following claims should be interpreted to include all those equivalent embodiments within the spirit and scope thereof.

What is claimed is:

1. Improved asynchronous time measurement apparatus, the improvement comprising:
(a) a first clock producing a repetitive clock signal at a first frequency;
(b) means connected to said first clock for counting complete clock cycles from a first event to a second event;
(c) means for accumulating charge during the time from the first event to a predetermined edge of said clock signal and the time from the second event to a predetermined edge of said clock signal and separately comparing the accumulated charges relative to a linear charge characteristic table generated using calibration measurement events of random duration and random separation from one another, the table being stored in a memory, to determine corresponding times therefor; and
(d) means for arithmetically processing the determined times corresponds to the first, second and complete clock cycle intervals to determine the magnitude of the elapsed time between the first event and the second event.

2. Apparatus as set forth in claim 1 including
(a) means for coupling a test fixture thereto, measuring the throughput delays of said test fixture and storing the measured delay values; and wherein
(b) said processing means accounts for said delays as it processes the magnitude of the elapsed time between the first event and the second event.

3. Apparatus as set forth in claim 1 including means for selecting a first of a series of events to be detected.

4. Apparatus as set forth in claim 3 wherein the first event is a start event.

5. Apparatus as set forth in claim 3 wherein the first event is a stop event.

6. Apparatus as set forth in claim 1 including means for selecting which edge of said clock cycles said start and stop events are measured relative to.

7. Apparatus as set forth in claim 6 including means for selectively monitoring said start and stop events relative to a rising clock edge.

8. Apparatus as set forth in claim 6 including means for selectively monitoring said start and stop events relative to a falling clock edge.

9. Apparatus as set forth in claim 1 wherein said charge accumulation means includes means operative during a calibration period for pseudorandomly coupling sample event signals of random duration and separation from one another thereto and storing corresponding values in said memory of accumulated charge relative to time, which values collectively define a straight line.

10. Apparatus as set forth in claim 9 for measuring multiple ones of said sample signals for each value stored in memory.

11. Apparatus as set forth in claim 9 further including:
(a) first and second counters;
(b) means for periodically enabling said counters to produce sample event pulses of random duration and separation from one another;
(c) means for discharging said charge accumulation means upon detection of a first pulse edge to a first potential and re-charging said charge accumulation means until an occurrence of the clock signal; and
(d) means responsive to the termination of each sample charge accumulation for storing a corresponding time value in said memory.

12. Apparatus as set forth in claim 11 wherein a plurality of samples are measured at each value and stored in said memory and wherein said stored values define a rising straight line.

13. Apparatus as set forth in claim 9 wherein the linear stored charge characteristic corresponds to one clock cycle.

14. Apparatus as set forth in claim 13 wherein said clock cycle is ten nanoseconds.

15. Time measurement apparatus comprising:
(a) a first clock producing a repetitive clock signal at a first frequency;
(b) means enabled upon detection of a first signal edge for discharging to a first potential and recharging until the first following edge of said clock signal;
(c) calibration means operative during a calibration period for addressably storing a plurality of measured voltages and a corresponding charging time developed by a charge storage means relative to a plurality of measured calibration sample events of random duration and random separation from one another;
(d) means for addressably coupling the measured voltage developed during each measured event to said storage means to determine the magnitude of the time interval; and
(e) means for displaying the determined time interval.

16. Apparatus as set forth in claim 15 wherein said storage means contains voltage samples for a single period of said first clock.

17. Apparatus as set forth in claim 15 wherein said calibration means includes:
(a) first and second counters;
(b) means for periodically enabling said counters to produce sample signals of random width and separation from one another; and
(c) means responsive to a termination of each sample charge accumulation for storing a corresponding time value in said addressable storage means.

18. Apparatus as set forth in claim 15 wherein said charge storage means includes:
(a) means enabled by the end of an event for storing charge until the first following edge of said clock signal; and wherein
(b) said time interval is determined by said means.

19. Apparatus as set forth in claim 15 including means for selectively enabling the initiation of event measurements for a selected plurality of events.

20. Apparatus as set forth in claim 19 wherein said processing means is programmed to compute a standard deviation of a plurality of measured events.

21. Apparatus as set forth in claim 19 wherein said processing means is programmed to compute an average of a plurality of measured events.

22. Apparatus as set forth in claim 19 including means for storing a maximum and minimum measured time intervals.

23. A method for precisely measuring time including the steps of:

(a) producing a repetitive clock signal at a first frequency;

(b) counting complete clock cycles from a start event to a stop event;

(c) accumulating charge during the time from the start event to a first following edge of said clock signal and the time from the stop event to the first following edge of said clock signal and separately comparing the accumulated charges relative to a linear charge characteristic table generated using calibration measurement events of random duration and random separation from one another, the table being stored in a memory, to determine corresponding times therefor; and (d) arithmetically processing the determined times of said start and stop event intervals and said complete clock cycle interval to determine the magnitude of the entire interval.

24. A method as set forth in claim 23 including the steps, during a calibration mode which occurs prior to the measurement of time, of pseudorandomly measuring sample event signals of random duration and separation from one another and storing the corresponding measured magnitudes 7 of accumulated charge in said memory and such that the sample magnitudes are reflective of a linear distribution relative to time.

25. A method as set forth in claim 24 including the steps of averaging a plurality of sample measurements and storing the average value in memory.

* * * * *

UNITED STATES PATENT AND TRADEMARK OFFICE

CERTIFICATE OF CORRECTION

PATENT NO. : 4,908,784
DATED : March 13, 1990
INVENTOR(S) : Gary W. Box et al

It is certified that error appears in the above-identified patent and that said Letters Patent is hereby corrected as shown below:

Col. 14, line 10, delete "7".

Signed and Sealed this

Sixth Day of August, 1991

*Attest:*

HARRY F. MANBECK, JR.

*Attesting Officer*

*Commissioner of Patents and Trademarks*